US010069883B2

(12) United States Patent
Das et al.

(10) Patent No.: US 10,069,883 B2
(45) Date of Patent: Sep. 4, 2018

(54) APPARATUS, SYSTEM AND METHOD OF COMMUNICATING IN A MULTICAST GROUP

(71) Applicant: INTEL IP CORPORATION, Santa Clara, CA (US)

(72) Inventors: Dibakar Das, Troy, NY (US); Po-Kai Huang, Santa Clara, CA (US); Elad Oren, Tel Aviv (IL); Emily H. Qi, Camas, WA (US); Minyoung Park, Portland, OR (US)

(73) Assignee: Intel IP Corporation, Santa Clara, CA (US)

( * ) Notice: Subject to any disclaimer, the term of this patent is extended or adjusted under 35 U.S.C. 154(b) by 151 days.

(21) Appl. No.: 14/998,279

(22) Filed: Dec. 26, 2015

(65) Prior Publication Data
US 2016/0374107 A1  Dec. 22, 2016

Related U.S. Application Data

(60) Provisional application No. 62/182,682, filed on Jun. 22, 2015.

(51) Int. Cl.
*H04L 29/06* (2006.01)
*H04W 72/12* (2009.01)

(52) U.S. Cl.
CPC ....... *H04L 65/4076* (2013.01); *H04W 72/121* (2013.01)

(58) Field of Classification Search
CPC ... H04L 12/1845; H04L 12/185; H04L 41/12; H04L 43/10; H04L 47/806; H04L 49/201;
(Continued)

(56) References Cited

U.S. PATENT DOCUMENTS 7,522,540 B1 * 4/2009 Maufer ................ H04L 45/18
370/254
7,649,884 B1 * 1/2010 Ahmed ............. H04L 12/1877
370/254
(Continued)

FOREIGN PATENT DOCUMENTS

CA  2896120 A1 * 1/2016 .......... H04W 72/005
CN  103634126 A  * 3/2014 .......... H04L 12/189
(Continued)

OTHER PUBLICATIONS

Wi-Fi Neighbour Awareness Networking (NAN), Technical Specification,Version 1.0, May 1, 2015, 98 pages.
(Continued)

*Primary Examiner* — Eric Nowlin
(74) *Attorney, Agent, or Firm* — Patent Capital Group

(57) ABSTRACT

Some demonstrative embodiments include apparatuses, systems and/or methods of communicating in a multicast group. For example, an apparatus may include logic and circuitry configured to cause a Neighbor Awareness Networking (NAN) device to process reception of a message including a scheduling attribute from a coordinator of a multicast group, the scheduling attribute comprising a service identifier (ID) corresponding to a service, scheduling information to indicate one or more timeblocks, a list of NAN devices belonging to the multicast group, and a scheduling rank of the coordinator; and based on the scheduling attribute, to connect with one or more NAN devices of the multicast group during at least one of the timeblocks to communicate traffic of the service.

22 Claims, 6 Drawing Sheets

(58) Field of Classification Search
CPC ........... H04L 63/065; H04L 2001/0093; H04L 45/20; H04L 65/4076; H04W 72/121; H04W 4/008; H04W 8/005; H04W 40/244; H04W 52/0216; H04W 56/001; H04W 56/0015; H04W 64/00; H04W 72/0446; H04W 76/023; H04W 76/043; H04W 84/12; H04W 84/18; H04W 84/20; H04W 88/04
See application file for complete search history.

(56) References Cited

U.S. PATENT DOCUMENTS

| | | | | |
|---|---|---|---|---|
| 7,957,301 B2* | 6/2011 | Bhatti | ................... | H04L 12/185 370/248 |
| 8,059,647 B2* | 11/2011 | Ashwood-Smith | ..... | H04L 12/18 370/390 |
| 8,095,614 B2* | 1/2012 | Hopkins | ................. | H04L 43/50 370/254 |
| 8,422,497 B2* | 4/2013 | Kang | .................... | H04L 12/185 370/230 |
| 8,630,291 B2* | 1/2014 | Shaffer | ................... | H04L 45/22 370/390 |
| 8,688,252 B2* | 4/2014 | Takahashi | ........... | H04L 41/0859 348/158 |
| 8,780,782 B2* | 7/2014 | Amerga | ................ | H04W 76/18 370/312 |
| 8,867,366 B2* | 10/2014 | Ashwood-Smith | ..... | H04L 12/18 370/238 |
| 9,008,088 B2* | 4/2015 | Ashwood-Smith | ......................... | H04L 12/462 370/390 |
| 9,276,845 B2* | 3/2016 | Shaffer | ................... | H04L 45/22 |
| 9,300,534 B2* | 3/2016 | Hopkins | ................. | H04L 43/50 |
| 9,462,549 B2* | 10/2016 | Alon | ................ | H04W 52/0216 |
| 9,565,657 B2* | 2/2017 | Suresh | ................ | H04W 72/005 |
| 9,572,105 B2* | 2/2017 | Wong | ................... | H04L 1/0003 |
| 2007/0165657 A1* | 7/2007 | Smith | ................... | H04L 12/18 370/401 |
| 2009/0201844 A1* | 8/2009 | Bhatti | ................... | H04L 12/185 370/312 |
| 2010/0097971 A1* | 4/2010 | Kang | ................... | H04L 12/185 370/312 |
| 2011/0032936 A1* | 2/2011 | Ashwood-Smith | ..... | H04L 12/18 370/390 |
| 2012/0078383 A1* | 3/2012 | Takahashi | ........... | H04L 41/0846 700/7 |
| 2012/0134357 A1* | 5/2012 | Ashwood Smith | ... | H04L 12/462 370/390 |
| 2013/0051250 A1* | 2/2013 | Shaffer | ................... | H04L 45/22 370/252 |
| 2013/0148660 A1* | 6/2013 | Ashwood-Smith | ......................... | H04L 12/462 370/390 |
| 2013/0242716 A1* | 9/2013 | Amerga | ................ | H04W 76/18 370/216 |
| 2014/0092769 A1* | 4/2014 | Shaffer | ................... | H04L 45/22 370/252 |
| 2014/0095864 A1* | 4/2014 | Dasgupta | ................ | H04L 45/64 713/155 |
| 2014/0195656 A1* | 7/2014 | Hopkins | ................ | H04L 43/50 709/221 |
| 2015/0163646 A1* | 6/2015 | Zhao | ..................... | H04L 12/189 370/312 |
| 2015/0282079 A1* | 10/2015 | Alon | ................ | H04W 52/0216 370/311 |
| 2015/0365885 A1* | 12/2015 | Yang | ....................... | H04W 4/06 370/312 |
| 2015/0373642 A1* | 12/2015 | Wong | ................... | H04L 1/0003 370/311 |
| 2016/0029346 A1* | 1/2016 | Suresh | ................ | H04W 72/005 340/539.16 |
| 2016/0286573 A1* | 9/2016 | Abraham | .............. | H04L 63/065 |
| 2016/0337836 A1* | 11/2016 | Kim | ......... | H04W 4/08 |
| 2016/0352568 A1* | 12/2016 | Lindoff | ............... | H04W 76/045 |
| 2017/0025861 A1* | 1/2017 | Lee | ........... | H02J 4/00 |
| 2017/0086247 A1* | 3/2017 | El Khayat | ............ | H04W 76/18 |
| 2017/0142661 A1* | 5/2017 | Wong | ................ | H04W 52/0274 |
| 2017/0257900 A1* | 9/2017 | Qi | ......................... | H04W 76/14 |

FOREIGN PATENT DOCUMENTS

| | | | | | |
|---|---|---|---|---|---|
| CN | 101877678 | B | * | 7/2014 | |
| CN | 104023316 | A | * | 9/2014 | .............. H04W 4/06 |
| CN | 105282835 | A | * | 1/2016 | ........... H04L 1/0003 |
| CN | 105307117 | A | * | 2/2016 | .......... H04W 72/005 |
| EP | 2876840 | A1 | * | 5/2015 | ........... H04L 12/189 |
| EP | 2876840 | A4 | * | 6/2015 | ........... H04L 12/189 |
| EP | 2955942 | A1 | * | 12/2015 | .............. H04W 4/06 |
| EP | 2958380 | A1 | * | 12/2015 | ........... H04L 1/0003 |
| EP | 2955942 | A4 | * | 1/2016 | .............. H04W 4/06 |
| EP | 2977971 | A1 | * | 1/2016 | .......... H04W 72/005 |
| JP | 6040465 | B2 | * | 12/2016 | ........... H04L 12/189 |
| KR | 20150120526 | A | * | 10/2015 | .............. H04W 4/06 |
| RU | 201514169 | A | * | 4/2017 | .............. H04W 4/06 |
| WO | WO-2006037362 | A1 | * | 4/2006 | ............. H04L 12/18 |
| WO | WO 2014029226 | A1 | * | 2/2014 | ........... H04L 12/189 |
| WO | WO 2014131300 | A1 | * | 9/2014 | .............. H04W 4/06 |
| WO | WO 2015126187 | A1 | * | 8/2015 | .............. H04W 4/08 |
| WO | WO 2015148065 | A1 | * | 10/2015 | ........ H04W 52/0216 |
| WO | WO-2016188567 | A1 | * | 12/2016 | .......... H04W 76/045 |

OTHER PUBLICATIONS

IEEE Std 802.11™-2012. IEEE Standard for Information technology—Telecommunications and information exchange between systems Local and metropolitan area networks—Specific requirements Part 11: Wireless LAN Medium Access Control (MAC) and Physical Layer (PHY) Specifications, Mar. 29, 2012, 2793 pages.

Wi-Fi Peer-to-Peer (P2P), Technical Specification, Version 1.5, 2014, Aug. 4, 2014, 183 pages.

\* cited by examiner

APPARATUS, SYSTEM AND METHOD OF COMMUNICATING IN A MULTICAST GROUP

CROSS REFERENCE

This application claims the benefit of and priority from U.S. Provisional Patent Application No. 62/182,682 entitled "APPARATUS, SYSTEM AND METHOD OF COMMUNICATING TRAFFIC BETWEEN A PLURALITY OF WIRELESS DEVICES", filed Jun. 22, 2015, the entire disclosures of which are incorporated herein by reference.

TECHNICAL FIELD

Embodiments described herein generally relate to communicating in a multicast group.

BACKGROUND

Awareness networking, for example, according to a Wireless Fidelity (Wi-Fi) Aware Specification, may enable wireless devices, for example, Wi-Fi devices, to perform device/service discovery, e.g., in their close proximity.

The awareness networking may include forming a cluster, e.g., a Wi-Fi Aware cluster, for devices in proximity. Devices in the same Wi-Fi Aware cluster may be configured to follow the same time schedule, e.g., a discovery window (DW), for example, to facilitate cluster formation and/or to achieve low power operation.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
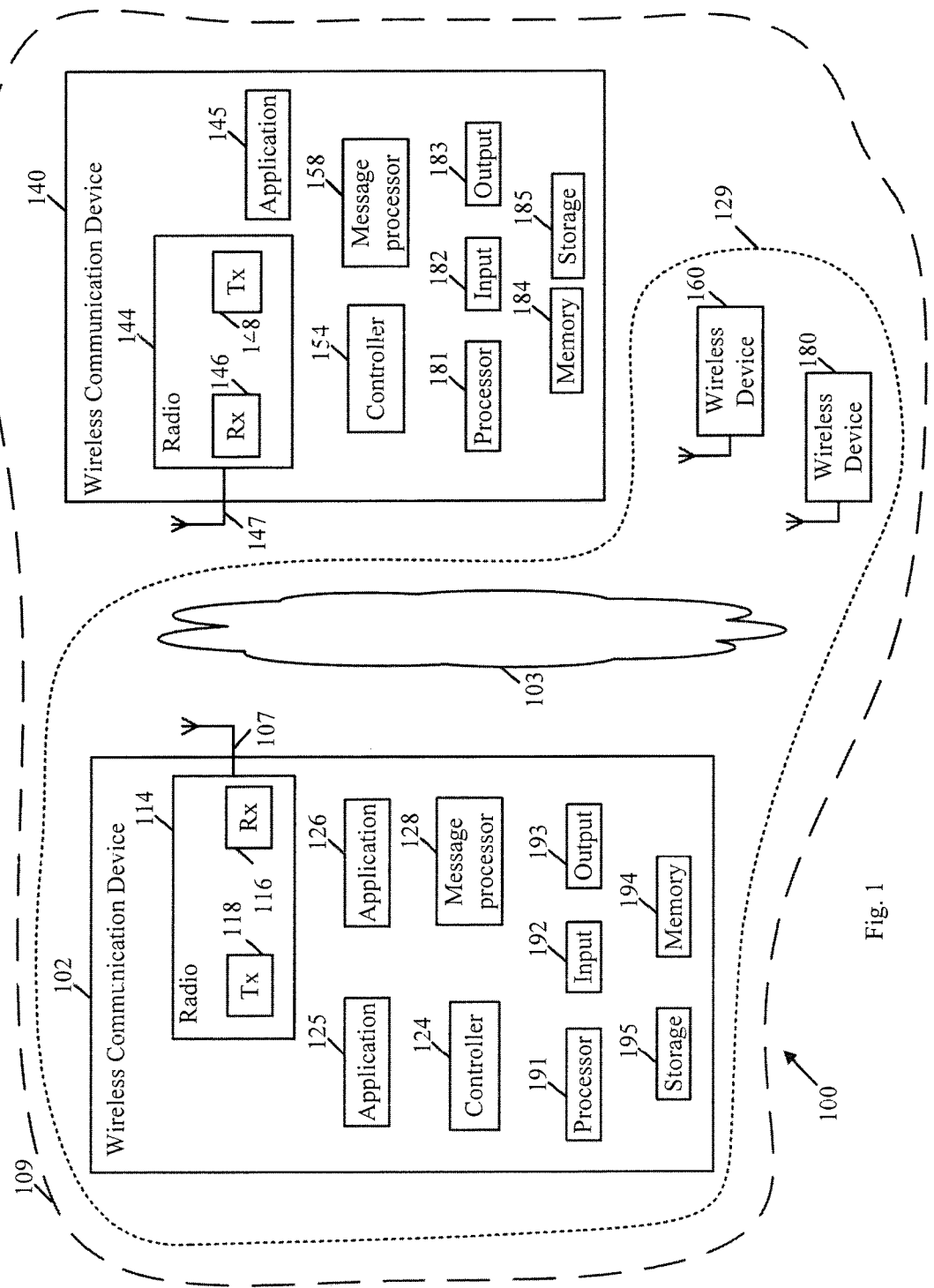
FIG. 1 is a schematic block diagram illustration of a system, in accordance with some demonstrative embodiments.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one embodiment", "an embodiment", "demonstrative embodiment", "various embodiments" etc, indicate that the embodiment(s) so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first", "second", "third" etc, to describe a common object, merely indicate that different instances of like objects are being referred to, and are not intended to imply that the objects so described must be in a given sequence, either temporally, spatially, in ranking, or in any other manner.

Some embodiments may be used in conjunction with devices and/or networks operating in accordance with existing Wireless Fidelity (WiFi) Alliance (WFA) Specifications (including Wi-Fi Neighbor Awareness Networking (NAN) Technical Specification, Version 1.0, May 1, 2015) and/or future versions and/or derivatives thereof, devices and/or networks operating in accordance with existing WFA Peer-to-Peer (P2P) specifications (WiFi P2P technical specification, version 1.5, Aug. 4, 2014) and/or future versions and/or derivatives thereof, devices and/or networks operating in accordance with existing Wireless-Gigabit-Alliance (WGA) specifications (Wireless Gigabit Alliance, Inc WiGig MAC and PHY Specification Version 1.1, April 2011, Final specification) and/or future versions and/or derivatives thereof, devices and/or networks operating in accordance with existing IEEE 802.11 standards (IEEE 802.11-2012, IEEE Standard for Information technology—Telecommunications and information exchange between systems Local and metropolitan area networks—Specific requirements Part 11: Wireless LAN Medium Access Control (MAC) and Physical Layer (PHY) Specifications, Mar. 29, 2012; IEEE802.11ac-2013 ("IEEE P802.11ac-2013, IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 4: Enhancements for Very High Throughput for Operation in Bands below 6 GHz", December, 2013); IEEE 802.11ad ("IEEE P802.11ad-2012, IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 3: Enhancements for Very High Throughput in the 60

GHz Band", 28 December, 2012); and/or IEEE-802.11REVmc ("IEEE 802.11-REVmc™/D3.0, June 2014 draft standard for Information technology—Telecommunications and information exchange between systems Local and metropolitan area networks Specific requirements; Part 11: Wireless LAN Medium Access Control (MAC) and Physical Layer (PHY) Specification")) and/or future versions and/or derivatives thereof, devices and/or networks operating in accordance with existing cellular specifications and/or protocols, e.g., 3rd Generation Partnership Project (3GPP), 3GPP Long Term Evolution (LTE) and/or future versions and/or derivatives thereof, units and/or devices which are part of the above networks, and the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may be used in conjunction with one or more types of wireless communication signals and/or systems, for example, Radio Frequency (RF), Infra Red (IR), Frequency-Division Multiplexing (FDM), Orthogonal FDM (OFDM), Orthogonal Frequency-Division Multiple Access (OFDMA), FDM Time-Division Multiplexing (TDM), Time-Division Multiple Access (TDMA), Multi-User MIMO (MU-MIMO), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G) mobile networks, 3GPP, Long Term Evolution (LTE), LTE advanced, Enhanced Data rates for GSM Evolution (EDGE), or the like. Other embodiments may be used in various other devices, systems and/or networks.

The term "wireless device", as used herein, includes, for example, a device capable of wireless communication, a communication device capable of wireless communication, a communication station capable of wireless communication, a portable or non-portable device capable of wireless communication, or the like. In some demonstrative embodiments, a wireless device may be or may include a peripheral that is integrated with a computer, or a peripheral that is attached to a computer. In some demonstrative embodiments, the term "wireless device" may optionally include a wireless service.

The term "communicating" as used herein with respect to a communication signal includes transmitting the communication signal and/or receiving the communication signal. For example, a communication unit, which is capable of communicating a communication signal, may include a transmitter to transmit the communication signal to at least one other communication unit, and/or a communication receiver to receive the communication signal from at least one other communication unit. The verb communicating may be used to refer to the action of transmitting or the action of receiving. In one example, the phrase "communicating a signal" may refer to the action of transmitting the signal by a first device, and may not necessarily include the action of receiving the signal by a second device. In another example, the phrase "communicating a signal" may refer to the action of receiving the signal by a first device, and may not necessarily include the action of transmitting the signal by a second device.

Some demonstrative embodiments may be used in conjunction with a WLAN, e.g., a wireless fidelity (WiFi) network. Other embodiments may be used in conjunction with any other suitable wireless communication network, for example, a wireless area network, a "piconet", a WPAN, a WVAN and the like.

As used herein, the term "circuitry" may refer to, be part of, or include, an Application Specific Integrated Circuit (ASIC), an integrated circuit, an electronic circuit, a processor (shared, dedicated, or group), and/or memory (shared, dedicated, or group), that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

The term "logic" may refer, for example, to computing logic embedded in circuitry of a computing apparatus and/or computing logic stored in a memory of a computing apparatus. For example, the logic may be accessible by a processor of the computing apparatus to execute the computing logic to perform computing functions and/or operations. In one example, logic may be embedded in various types of memory and/or firmware, e.g., silicon blocks of various chips and/or processors. Logic may be included in, and/or implemented as part of, various circuitry, e.g. radio circuitry, receiver circuitry, control circuitry, transmitter circuitry, transceiver circuitry, processor circuitry, and/or the like. In one example, logic may be embedded in volatile memory and/or non-volatile memory, including random access memory, read only memory, programmable memory, magnetic memory, flash memory, persistent memory, and/or the like. Logic may be executed by one or more processors using memory, e.g., registers, buffers, stacks, and the like, coupled to the one or more processors, e.g., as necessary to execute the logic.

The term "antenna", as used herein, may include any suitable configuration, structure and/or arrangement of one or more antenna elements, components, units, assemblies and/or arrays. In some embodiments, the antenna may implement transmit and receive functionalities using separate transmit and receive antenna elements. In some embodiments, the antenna may implement transmit and receive functionalities using common and/or integrated transmit/receive elements. The antenna may include, for example, a phased array antenna, a single element antenna, a set of switched beam antennas, and/or the like.

The phrase "peer to peer (PTP) communication", as used herein, may relate to device-to-device communication over a wireless link ("peer-to-peer link") between devices. The PTP communication may include, for example, a WiFi Direct (WFD) communication, e.g., a WFD Peer to Peer (P2P) communication, wireless communication over a direct link within a QoS basic service set (BSS), a tunneled direct-link setup (TDLS) link, a STA-to-STA communication in an independent basic service set (IBSS), or the like.

Some demonstrative embodiments are described herein with respect to WiFi communication. However, other embodiments may be implemented with respect to any other communication scheme, network, standard and/or protocol.

Reference is now made to FIG. 1, which schematically illustrates a block diagram of a system 100, in accordance with some demonstrative embodiments.

As shown in FIG. 1, in some demonstrative embodiments system 100 may include a wireless communication network including one or more wireless communication devices, e.g., wireless communication devices 102, 140, 160 and/or 180.

In some demonstrative embodiments, wireless communication devices 102, 140, 160 and/or 180 may include, for example, a UE, an MD, a STA, an AP, a PC, a desktop computer, a mobile computer, a laptop computer, an Ultrabook™ computer, a notebook computer, a tablet computer, a server computer, a handheld computer, a handheld device, an Internet of Things (IoT) device, a sensor device, a wearable device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "Carry Small Live Large" (CSLL) device, an Ultra Mobile Device (UMD), an Ultra Mobile PC (UMPC), a Mobile Internet Device (MID), an "Origami" device or computing device, a device that supports Dynamically Composable Computing (DCC), a context-aware device, a video device, an audio device, an A/V device, a Set-Top-Box (STB), a Blu-ray disc (BD) player, a BD recorder, a Digital Video Disc (DVD) player, a High Definition (HD) DVD player, a DVD recorder, a HD DVD recorder, a Personal Video Recorder (PVR), a broadcast HD receiver, a video source, an audio source, a video sink, an audio sink, a stereo tuner, a broadcast radio receiver, a flat panel display, a Personal Media Player (PMP), a digital video camera (DVC), a digital audio player, a speaker, an audio receiver, an audio amplifier, a gaming device, a data source, a data sink, a Digital Still camera (DSC), a media player, a Smartphone, a television, a music player, or the like.

In some demonstrative embodiments, devices 102, 140, 160 and/or 180 may include, operate as, and/or perform the functionality of one or more STAs. For example, device 102 may include at least one STA, and/or device 140 may include at least one STA In some demonstrative embodiments, devices 102, 140, 160 and/or 180 may include, operate as, and/or perform the functionality of one or more WLAN STAs.

In some demonstrative embodiments, devices 102, 140, 160 and/or 180 may include, operate as, and/or perform the functionality of one or more Wi-Fi STAs.

In some demonstrative embodiments, devices 102, 140, 160 and/or 180 may include, operate as, and/or perform the functionality of one or more BT devices.

In some demonstrative embodiments, devices 102, 140, 160 and/or 180 may include, operate as, and/or perform the functionality of one or more Neighbor Awareness Networking (NAN) STAs.

In some demonstrative embodiments, devices 102, 140, 160 and/or 180 may include, operate as, and/or perform the functionality of one or more location measurement STAs.

In one example, a station (STA) may include a logical entity that is a singly addressable instance of a medium access control (MAC) and physical layer (PHY) interface to the wireless medium (WM). The STA may perform any other additional or alternative functionality.

In some demonstrative embodiments, devices 102, 140, 160 and/or 180 may include, operate as, and/or perform the functionality of any other devices and/or STAs.

In some demonstrative embodiments, devices 102, 140, 160 and/or 180 may be configured to operate as, and/or to perform the functionality of, an access point (AP) STA.

In some demonstrative embodiments, devices 102, 140, 160 and/or 180 may be configured to operate as, and/or to perform the functionality of, a non-AP STA.

In one example, an AP may include an entity that contains a station (STA), e.g., one STA, and provides access to distribution services, via the wireless medium (WM) for associated STAs. The AP may perform any other additional or alternative functionality.

In one example, a non-AP STA may include a STA that is not contained within an AP. The non-AP STA may perform any other additional or alternative functionality.

In one example, device 102 may be configured to operate as, and/or to perform the functionality of an AP STA, and/or device 140 may be configured to operate as, and/or to perform the functionality of a non-AP STA.

In some demonstrative embodiments, device 102 may include, for example, one or more of a processor 191, an input unit 192, an output unit 193, a memory unit 194, and/or a storage unit 195; and/or devices 140, 160 and/or 180 may include, for example, one or more of a processor 181, an input unit 182, an output unit 183, a memory unit 184, and/or a storage unit 185. Devices 102, 140, 160 and/or 180 may optionally include other suitable hardware components and/or software components. In some demonstrative embodiments, some or all of the components of one or more of devices 102, 140, 160 and/or 180 may be enclosed in a common housing or packaging, and may be interconnected or operably associated using one or more wired or wireless links. In other embodiments, components of one or more of devices 102, 140, 160 and/or 180 may be distributed among multiple or separate devices.

Processor 191 and/or processor 181 includes, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multipurpose or specific processor or controller. Processor 191 executes instructions, for example, of an Operating System (OS) of device 102 and/or of one or more suitable applications. Processor 181 executes instructions, for example, of an Operating System (OS) of device 140 and/or of one or more suitable applications.

Input unit 192 and/or input unit 182 includes, for example, a keyboard, a keypad, a mouse, a touch-screen, a touch-pad, a track-ball, a stylus, a microphone, or other suitable pointing device or input device. Output unit 193 and/or output unit 183 includes, for example, a monitor, a screen, a touch-screen, a flat panel display, a Light Emitting Diode (LED) display unit, a Liquid Crystal Display (LCD)

display unit, a plasma display unit, one or more audio speakers or earphones, or other suitable output devices.

Memory unit 194 and/or memory unit 184 includes, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 195 and/or storage unit 185 includes, for example, a hard disk drive, a floppy disk drive, a Compact Disk (CD) drive, a CD-ROM drive, a DVD drive, or other suitable removable or non-removable storage units. Memory unit 194 and/or storage unit 195, for example, may store data processed by device 102. Memory unit 184 and/or storage unit 185, for example, may store data processed by device 140.

In some demonstrative embodiments, wireless communication devices 102, 140, 160 and/or 180 may be capable of communicating content, data, information and/or signals via a wireless medium (WM) 103. In some demonstrative embodiments, wireless medium 103 may include, for example, a radio channel, a cellular channel, a Global Navigation Satellite System (GNSS) Channel, an RF channel, a Wireless Fidelity (WiFi) channel, an IR channel, a Bluetooth (BT) channel, and the like.

In some demonstrative embodiments, wireless communication medium 103 may include a wireless communication channel over a 2.4 Gigahertz (GHz) frequency band, a 5 GHz frequency band, a millimeterWave (mmWave) frequency band, e.g., a 60 GHz frequency band, a Sub 1 Gigahertz (S1G) band, and/or any other frequency band.

In some demonstrative embodiments, devices 102, 140, 160 and/or 180 may include one or more radios including circuitry and/or logic to perform wireless communication between devices 102, 140, 160, 180 and/or one or more other wireless communication devices. For example, device 102 may include at least one radio 114, and/or device 140 may include at least one radio 144.

In some demonstrative embodiments, radio 114 may include one or more wireless receivers (Rx) including circuitry and/or logic to receive wireless communication signals, RF signals, frames, blocks, transmission streams, packets, messages, data items, and/or data. For example, radio 114 may include at least one receiver 116, and/or radio 144 may include at least one receiver 146.

In some demonstrative embodiments, radios 114 and/or 144 may include one or more wireless transmitters (Tx) including circuitry and/or logic to transmit wireless communication signals, RF signals, frames, blocks, transmission streams, packets, messages, data items, and/or data. For example, radio 114 may include at least one transmitter 118, and/or radio 144 may include at least one transmitter 148.

In some demonstrative embodiments, radios 114 and/or 144 may be configured to communicate over a 2.4 GHz band, a 5 GHz band, an mmWave band, a S1G band, and/or any other band.

In some demonstrative embodiments, radios 114 and/or 144 may include, or may be associated with, one or more antennas 107 and/or 147, respectively.

In one example, device 102 may include a single antenna 107. In another example, device 102 may include two or more antennas 107.

In one example, device 140 may include a single antenna 147. In another example, device 140 may include two or more antennas 147.

Antennas 107 and/or 147 may include any type of antennas suitable for transmitting and/or receiving wireless communication signals, blocks, frames, transmission streams, packets, messages and/or data. For example, antennas 107 and/or 147 may include any suitable configuration, structure and/or arrangement of one or more antenna elements, components, units, assemblies and/or arrays. Antennas 107 and/or 147 may include, for example, antennas suitable for directional communication, e.g., using beamforming techniques. For example, antennas 107 and/or 147 may include a phased array antenna, a multiple element antenna, a set of switched beam antennas, and/or the like. In some embodiments, antennas 107 and/or 147 may implement transmit and receive functionalities using separate transmit and receive antenna elements. In some embodiments, antennas 107 and/or 147 may implement transmit and receive functionalities using common and/or integrated transmit/receive elements.

In some demonstrative embodiments, wireless communication devices 102, 140, 160 and/or 180 may form, and/or may communicate as part of, a wireless local area network (WLAN).

In some demonstrative embodiments, wireless communication devices 102, 140, 160 and/or 180 may form, and/or may communicate as part of, a WiFi network.

In some demonstrative embodiments, wireless communication devices 102, 140, 160 and/or 180 may form, and/or may communicate as part of, a WiFi Direct (WFD) network, e.g., a WiFi direct services (WFDS) network, and/or may perform the functionality of one or more WFD devices.

In one example, wireless communication devices 102, 140, 160 and/or 180 may include, or may perform the functionality of a WiFi Direct device.

In some demonstrative embodiments, wireless communication devices 102, 140, 160 and/or 180 may be capable of performing awareness networking communications, for example, according to an awareness protocol, e.g., a WiFi aware protocol, and/or any other protocol, e.g., as described below.

In some demonstrative embodiments, wireless communication devices 102, 140, 160 and/or 180 may be capable of forming, and/or communicating as part of, a Neighbor Awareness Networking (NAN) network, e.g., a WiFi NAN or WiFi Aware network, and/or may perform the functionality of one or more NAN devices ("WiFi aware devices").

In some demonstrative embodiments, wireless communication medium 103 may include a direct link, for example, a PTP link, e.g., a WiFi direct P2P link or any other PTP link, for example, to enable direct communication between wireless communication devices 102, 140, 160 and/or 180.

In some demonstrative embodiments, wireless communication devices 102, 140, 160 and/or 180 may perform the functionality of WFD P2P devices. For example, devices 102, 140, 160 and/or 180 may be able to perform the functionality of a P2P client device, and/or P2P group Owner (GO) device.

In other embodiments, wireless communication devices 102, 140, 160 and/or 180 may form, and/or communicate as part of, any other network, and/or may perform the functionality of any other wireless devices or stations.

In some demonstrative embodiments, devices 102, 140, 160 and/or 180 may include one or more applications configured to provide, share, and/or to use one or more services, e.g., a social application, a file sharing application, a media application and/or the like, for example, using an awareness network, NAN network ("WiFi Aware network"), a PTP network, a P2P network, WFD network, or any other network.

In some demonstrative embodiments, device 102 may execute an application 125 and/or an application 126. In some demonstrative embodiments, device 140 may execute an application 145.

In some demonstrative embodiments, devices 102, 140, 160 and/or 180 may be capable of sharing, showing, sending, transferring, printing, outputting, providing, synchronizing, and/or exchanging content, data, and/or information, e.g., between applications and/or services of devices 102, 140, 160 and/or 180 and/or one or more other devices.

In some demonstrative embodiments, devices 102, 140, 160 and/or 180 may include a controller configured to control one or more functionalities of devices 102, 140, 160 and/or 180, for example, one or more functionalities of communication, e.g., awareness networking communications, WiFi Aware (NAN) communication and/or any other communication, between devices 102, 140, 160 and/or 180 and/or other devices, and/or any other functionality, e.g., as described below. For example, device 102 may include a controller 124, and/or device 140 may include a controller 154.

In some demonstrative embodiments, controller 124 may be configured to perform one or more functionalities, communications, operations and/or procedures between wireless communication devices 102, 140, 160 and/or 180, and/or one or more other devices, e.g., as described below.

In some demonstrative embodiments, controller 124 may include circuitry and/or logic, e.g., one or more processors including circuitry and/or logic, memory circuitry and/or logic, Media-Access Control (MAC) circuitry and/or logic, Physical Layer (PHY) circuitry and/or logic, and/or any other circuitry and/or logic, configured to perform the functionality of controller 124. Additionally or alternatively, one or more functionalities of controller 124 may be implemented by logic, which may be executed by a machine and/or one or more processors, e.g., as described below.

In one example, controller 124 may include circuitry and/or logic, for example, one or more processors including circuitry and/or logic, to cause, trigger and/or control a wireless device, e.g., device 102, and/or a wireless station, e.g., a wireless STA implemented by device 102, to perform one or more operations, communications and/or functionalities, e.g., as described herein.

In one example, controller 154 may include circuitry and/or logic, for example, one or more processors including circuitry and/or logic, to cause, trigger and/or control a wireless device, e.g., device 140, and/or a wireless station, e.g., a wireless STA implemented by device 140, to perform one or more operations, communications and/or functionalities, e.g., as described herein.

In one example, controller 124 may perform one or more functionalities of a NAN engine, e.g., a NAN discovery engine (DE), for example to process one or more service queries and/or responses, e.g., from applications and/or services on devices 102, 140, 160 and/or 180, and/or one or more other devices.

In one example, controller 154 may perform one or more functionalities of a NAN engine, e.g., a NAN discovery engine (DE), for example to process one or more service queries and/or responses, e.g., from applications and/or services on devices 102, 140, 160 and/or 180, and/or one or more other devices.

In some demonstrative embodiments, device 102 may include a message processor 128 configured to generate, process and/or access one or messages communicated by device 102.

In one example, message processor 128 may be configured to generate one or more messages to be transmitted by device 102, and/or message processor 128 may be configured to access and/or to process one or more messages received by device 102, e.g., as described below. In one example, message processor 128 may be configured to process transmission of one or more messages from a wireless station, e.g., a wireless STA implemented by device 102; and/or message processor 128 may be configured to process reception of one or more messages by a wireless station, e.g., a wireless STA implemented by device 102.

In some demonstrative embodiments, device 140 may include a message processor 158 configured to generate, process and/or access one or messages communicated by device 140.

In one example, message processor 158 may be configured to generate one or more messages to be transmitted by device 140, and/or message processor 158 may be configured to access and/or to process one or more messages received by device 140, e.g., as described below. In one example, message processor 158 may be configured to process transmission of one or more messages from a wireless station, e.g., a wireless STA implemented by device 140; and/or message processor 158 may be configured to process reception of one or more messages by a wireless station, e.g., a wireless STA implemented by device 140.

In some demonstrative embodiments, message processors 128 and/or 158 may include circuitry and/or logic, e.g., one or more processors including circuitry and/or logic, memory circuitry and/or logic, Media-Access Control (MAC) circuitry and/or logic, Physical Layer (PHY) circuitry and/or logic, and/or any other circuitry and/or logic, configured to perform the functionality of message processors 128 and/or 158. Additionally or alternatively, one or more functionalities of message processors 128 and/or 158 may be implemented by logic, which may be executed by a machine and/or one or more processors, e.g., as described below.

In one example, message processors 128 and/or 158 may perform one or more functionalities of a NAN MAC configured to generate, process and/or handle one or more NAN messages, e.g., NAN Beacon frames and/or NAN Service Discovery frames.

In some demonstrative embodiments, at least part of the functionality of message processor 128 may be implemented as part of radio 114.

In some demonstrative embodiments, at least part of the functionality of message processor 128 may be implemented as part of controller 124.

In other embodiments, the functionality of message processor 128 may be implemented as part of any other element of device 102.

In some demonstrative embodiments, at least part of the functionality of controller 124, radio 114, and/or message processor 128 may be implemented by an integrated circuit, for example, a chip, e.g., a System in Chip (SoC). In one example, the chip or SoC may be configured to perform one or more functionalities of radio 114. For example, the chip or SoC may include one or more elements of controller 124, one or more elements of message processor 128, and/or one or more elements of radio 114. In one example, controller 124, message processor 128, and radio 114 may be implemented as part of the chip or SoC.

In some demonstrative embodiments, at least part of the functionality of message processor 158 may be implemented as part of radio 144.

In some demonstrative embodiments, at least part of the functionality of message processor 158 may be implemented as part of controller 154.

In other embodiments, the functionality of message processor 158 may be implemented as part of any other element of device 140.

In some demonstrative embodiments, at least part of the functionality of controller 154, radio 144, and/or message processor 158 may be implemented by an integrated circuit, for example, a chip, e.g., a System in Chip (SoC). In one example, the chip or SoC may be configured to perform one or more functionalities of radio 144. For example, the chip or SoC may include one or more elements of controller 154, one or more elements of message processor 158, and/or one or more elements of radio 144. In one example, controller 154, message processor 158, and radio 144 may be implemented as part of the chip or SoC.

In some demonstrative embodiments, devices 102, 140, 160 and/or 180 may perform the functionality of a device or station, for example, an awareness networking device, a NAN device, a WiFi device, a WiFi Aware device, a WFD device, a WLAN device and/or any other device, capable of discovering other devices according to a discovery protocol and/or scheme.

In some demonstrative embodiments, radios 114 and/or 144 may communicate over wireless communication medium 103 according to an awareness networking scheme, for example, a discovery scheme, for example, a WiFi Aware discovery scheme ("NAN discovery scheme"), and/or any other awareness networking and/or discovery scheme, e.g., as described below.

In some demonstrative embodiments, the awareness networking scheme, e.g., NAN, may enable applications to discover services in their close proximity. For example, the NAN technology may be a low power service discovery, which may, for example, scale efficiently, e.g., in dense Wi-Fi environments.

In some demonstrative embodiments, a device, e.g., wireless communication devices 102, 140, 160 and/or 180, may include one or more blocks and/or entities to perform network awareness functionality. For example, a device, e.g., devices 102, 140, 160 and/or 180, may be capable of performing the functionality of a NAN device, may include a NAN MAC and/or a Discovery Engine (DE). In one example, controllers 124 and/or 154 may be configured to perform the functionality of the discovery engine, and/or message processors 128 and/or 158 may be configured to perform the functionality of the NAN MAC, e.g., as described above. In another example, the functionality of the NAN MAC and/or the Discovery engine may be performed by any other element and/or entity of devices 102, 140, 160 and/or 180.

In some demonstrative embodiments, the awareness networking scheme may include a discovery scheme or protocol, e.g., as described below.

In some demonstrative embodiments, devices 102, 140, 160 and/or 180 may perform a discovery process according to the awareness networking scheme, for example, to discover each other and/or to establish a wireless communication link, e.g., directional and/or high throughput wireless communication link and/or any other link.

In some demonstrative embodiments, devices 102, 140, 160 and/or 180 may be configured to enable time synchronization between devices 102, 140, 160, 180 and/or one or more other devices, e.g., performing the functionality of Wi-Fi stations (STAs), for example, such that STAs can discover each other more efficiently and/or quickly.

Some demonstrative embodiments are described below with respect to a NAN discovery scheme, and to NAN discovery frames of the NAN discovery scheme. However, in other embodiments, any other discovery scheme and/or discovery frames may be used.

In some demonstrative embodiments, the discovery scheme may include a plurality of contention-based discovery windows (DWs).

In some demonstrative embodiments, communication during the DWs may be configured to enable time synchronization between Wi-Fi stations (STAs), e.g., devices 102, 140, 160 and/or 180, so that STAs can find each other more efficiently during a DW.

In some demonstrative embodiments, devices of an awareness network, e.g., a NAN network, may form one or more clusters, e.g., in order to publish and/or subscribe for services. A NAN cluster may be defined by an Anchor Master (AM) (also referred to as a "NAN master device" or "anchor device"). In one example, the AM may include a NAN device, which has the highest rank in the NAN cluster.

In some demonstrative embodiments, NAN data exchange may be reflected by discovery frames, e.g., Publish, Subscribe and/or Follow-Up Service discovery frames (SDF). These frames may include action frames, which may be sent by a device that wishes to publish a service/application, and/or to subscribe to a published service/application at another end.

In one example, one of devices 102, 140, 160 and/or 180, e.g., device 102, may perform the functionality of an AM. The AM may be configured to transmit one or more beacons. Another one of devices 102, 140, 160 and/or 180, e.g., device 140, may be configured to receive and process the beacons.

In one example, devices 102, 140, 160 and/or 180 may perform the functionality of NAN devices, e.g., belonging to a NAN cluster, which may share a common set of NAN parameters, for example, including a common NAN timestamp, and/or a common time period between consecutive discovery windows (DWs). The NAN timestamp may be communicated, for example, as part of a NAN beacon frame, which may be communicated in the NAN cluster. In one example, the NAN timestamp may include a Time Synchronization Function (TSF) value, for example, a cluster TSF value, or any other value.

In some demonstrative embodiments, devices 102, 140, 160 and/or 180 may be configured to discover one another over a predefined communication channel ("the social channel"). In one example, the Channel 6 in the 2.4 GHz band may be defined as the NAN social channel. Any other channel may be used as the social channel.

In some demonstrative embodiments, devices 102, 140, 160 and/or 180 may transmit discovery frames, e.g., SDFs, during the plurality of DWs, e.g., over the social channel. For example the NAN AM may advertize the time of the DW, during which NAN devices may exchange SDFs.

In one example, devices 102, 140, 160 and/or 180 may transmit the discovery frames to discover each other, for example, to enable using the one or more services provided by applications 125 and/or 126.

In some demonstrative embodiments, devices 102, 140, 160 and/or 180 may communicate during a DW according to a contention mechanism. For example, devices 102, 140, 160 and/or 180 may check whether or not a channel is unoccupied prior to an attempt to transmit a discovery frame during the discovery window.

In some demonstrative embodiments, a device of devices 102, 140, 160 and/or 180, e.g., device 102, may not transmit the discovery frame during the DW, e.g., if the channel is occupied. In some demonstrative embodiments, device 102 may transmit the discovery frame during the DW, e.g., if the channel is unoccupied.

In some embodiments, the discovery frame may be transmitted as a group addressed, e.g., broadcast or multicast, discovery frame. In other embodiments, the discovery frame may be transmitted as any other type of frame.

In some demonstrative embodiments, the discovery frame may not require an acknowledgement frame. According to these embodiments, a transmitter of the discovery frame may not backoff a transmission of the discovery frame.

In some demonstrative embodiments, the discovery frame transmitted by device 102 during the DW may be configured to enable other devices or services that are running on other devices to discover the services on device 102.

In some demonstrative embodiments, devices of system 100 may utilize availability information, e.g., in the form of an Availability Interval Bitmap and/or Further Availability Map, for example, to allow a device of devices 102, 140, 160 and/or 180, to advertise its availability, for example, in terms of at least one channel and one or more timeslots, during which the device may be available, e.g., active ("awake"), for example, to perform post NAN activities.

In one example, the availability information may be communicated as part of an Availability Attribute, e.g., including a 32-bit bitmap for 32 timeslots, for example, wherein each timeslot is 16 milliseconds (ms) long. For example, each bit that is not zero may represent a timeslot, during which a device sending the Availability Attribute is to be awake and available to send and/or receive data in a specified method.

In some demonstrative embodiments, devices 102, 140, 160 and/or 180 may be part of an awareness cluster, e.g., a NAN cluster 109.

In some demonstrative embodiments, devices 102, 140, 160 and/or 180 may be configured to communicate according to a Wi-Fi Aware specification and/or any other awareness networking specification, which may be configured to allow a group of devices to discover other devices/services nearby and/or in close proximity, e.g., with low power.

In some demonstrative embodiments, devices 102, 140, 160 and/or 180 may form NAN cluster 109 and may synchronize to the same clock, e.g., as described above.

In one example, all devices of the same cluster, e.g., NAN cluster 109, may converge on a time period and channel, e.g., a DW, to facilitate the discovery of services of devices 102, 140, 160 and/or 180, and/or to achieve low power consumption, e.g., as described above.

In some demonstrative embodiments, devices 102, 140, 160 and/or 180 may be configured to enable data transmission for a specific service among multiple devices, post service discovery.

In some demonstrative embodiments, to enable data transmission post service discovery between two devices, the two devices may be required to use a common schedule, e.g., to be available at a same channel at a same time.

In some demonstrative embodiments, device 102 may be configured to determine the schedule for data transmission post service discovery with devices 140, 160 and/or 180, for example, based on a base schedule, e.g., as described below.

In some demonstrative embodiments, devices 102, 140, 160 and/or 180 may be configured to utilize schemes, which may enable devices 102, 140, 160 and/or 180 to transmit data to each other, e.g., without any infrastructure, e.g., directly.

In some demonstrative embodiments, after the discovery process, a set of devices of a cluster, e.g., devices 102, 140, 160 and/or 180, may form a group, e.g., a data link group ("data group").

In some demonstrative embodiments, devices of the data link group may be configured to meet on fixed time periods and channels, which may be referred to as "timeblocks", to communicate with each other.

In some demonstrative embodiments, an announcement of the timeblocks may be made by a device in the group, e.g., during the discovery window.

In some demonstrative embodiments, devices 102, 140, 160 and/or 180 may be configured to perform multicast transmissions, e.g., as described below.

Some demonstrative embodiments may enable multicast traffic, e.g., multicast transmission, within a group ("a multicast group") of NAN devices, which belong to the same cluster. For example, embodiments described herein may enable multicast traffic between devices of a multicast group including devices 102, 140, 160 and/or 180 of NAN cluster 109.

Some demonstrative embodiments are described herein with reference to a multicast transmission to a multicast group. Other embodiments may include or may be implemented with respect to a multi-user transmission, multi-device transmission, multi-station transmission, group transmission, one-to-many transmission, many-to-many transmission, and/or or any other transmission to a plurality of devices, stations, users and/or destinations.

In some demonstrative embodiments, devices 102, 140, 160 and/or 180 may be configured to enable delivery of traffic from a device, e.g., device 102, to a plurality of devices of a multicast group, e.g., including devices 140, 160 and/or 180, for example, in the form of multicast traffic, group-addressed traffic, multi-user traffic, or any other form of traffic to be transmitted to a plurality of devices.

In some demonstrative embodiments, devices 102, 140, 160 and/or 180 may be configured to perform many-to-many multicast transmissions, e.g., as described below.

For example, some Specification Requirement Documents (SRD), for example, of a NAN Specification, may relate to a need to provide mechanisms supporting many-to-many multicast transmissions.

In one example, a plurality of users may play a multiplayer game on their phones during a school trip. According to this example, the plurality of users may be required to hear each other and share the same service, and, accordingly, may form a fully connected group and exchange data using multicast transmissions.

Some demonstrative embodiments may provide one or more mechanisms, which may enable to determine how a device should join or leave a multicast session, for example, to maintain a fully connected multicast group, e.g., as described below.

Some demonstrative embodiments may provide one or more mechanisms to determine how devices communicate or re-create a fully connected multicast group, for example, when new devices move in and out of an area, e.g., as described below.

Some demonstrative embodiments may provide one or more mechanisms to maintain a fully connected multicast group, for example, in the situation when a device joins a multicast group, e.g., as described below.

Some demonstrative embodiments may provide one or more mechanisms to enable, for example, a coordinator of a multicast group to make sure that the multicast group is still fully connected, e.g., as described below.

Some demonstrative embodiments may provide one or more mechanisms to maintain, for example, a fully connected multicast group, e.g., in a situation when a device leaves the multicast group, or when the device is removed from the multicast group, e.g., as described below.

Some demonstrative embodiments may provide one or more mechanisms of a selection process to select a new coordinator of the multicast group, e.g., as described below.

Some demonstrative embodiments may provide one or more mechanisms to maintain a fully connected group and/or possibly elect a new coordinator, for example, when any device joins or leaves the multicast group, e.g., as described below.

In some demonstrative embodiments, the selection process of the new coordinator may be designed, for example, to maximize the size of the fully connected multicast group and/or to maintain the existing connection, e.g., as described below.

In some demonstrative embodiments, devices 102, 140, 160 and/or 180 may be configured to maintain, for example, a fully connected multicast group in a situation when a new device joins a multicast group, e.g., as described below.

In some demonstrative embodiments, devices 102, 180 and 160 may belong to and/or form a multicast group 129, device 102 may perform the functionality of a coordinator of the multicast group 129, and device 140 may request to join the multicast group 129.

In some demonstrative embodiments, the coordinator of multicast group 129, e.g., device 102, may be configured to announce a schedule, e.g., to be used to exchange data for the service, for example, for every device in the multicast group, e.g., as described below.

In some demonstrative embodiments, multicast group 129 may include a many-to many group, in which, for example, each of devices 102, 160 and 180 may be configured to communicate with all other devices of multicast group 129.

In some demonstrative embodiments, device 140 may be configured to listen to a schedule of the multicast group 129, e.g., transmitted from a coordinator of the multicast group, and, based on the schedule, to join the multicast group, e.g., as described below.

In some demonstrative embodiments, controller 124 may be configured to control, cause and/or trigger device 102 and/or message processor 128 to generate a scheduling attribute including a service identifier (ID) corresponding to a service, scheduling information to indicate one or more timeblocks, a list of NAN devices belonging to a multicast group coordinated by the NAN device, and a scheduling rank of device 102.

In some demonstrative embodiments, the list of devices belonging to the multicast group may include a list of identifiers, for example, a list of MAC addresses, of the devices belonging to the multicast group. In other embodiments, the list of devices may include and/or may be in any other format, e.g., using bloom filters.

Some demonstrative embodiments are described herein with respect to a scheduling attribute, e.g., as described below. In other embodiments, one or more elements of the scheduling attribute may be communicated in any other format, for example, as part of a frame, message, information element, field, and the like.

For example, device 102 may generate the scheduling attribute including a service identifier corresponding to a service provided by application 125 or 126, scheduling information to indicate one or more timeblocks to exchange data corresponding to the service, a list of identifiers of devices 102, 160 and 180 belonging to multicast group 129, and a scheduling rank of device 102.

In some demonstrative embodiments, the scheduling information may include an availability indication, e.g., in the form of a multicast availability bitmap, to which the other devices of multicast group 129 can align, e.g., to communicate multicast traffic.

In some demonstrative embodiments, the availability indication may indicate, for example, one or more time slots and/or channels, during which multicast traffic may be communicated by devices of the multicast group 129, e.g., as described below.

In some demonstrative embodiments, the devices of the multicast group 129 may be configured to exchange multicast data in the available timeslots, e.g., according to the multicast availability bitmap.

In one example, the scheduling attribute may include a plurality of fields including at least a service ID field, a list of devices in the multicast group field, a field including an identification of the multicast group, a field indicating the availability indication, a field indicating rates supported by the service, and/or a refresh interval field, e.g., in addition to a Further Availability Bitmap representing timeblocks, in which all devices in the multicast group are awake, e.g., as follows:

TABLE 1

| Field | Size | Value | Description |
|---|---|---|---|
| Attribute ID | 1 | TBD | Identifies the type of NAN attribute, e.g., scheduling attribute. |
| Type | 1 | Variable | Indicate the type of the attribute, e.g., scheduling |
| Service ID | 1 | variable | Indicate the service ID |
| Group ID | 1 | variable | Indicate a specific group of the service |
| Refresh Interval | 1 | variable | Indicate the refresh interval |
| Rank | 1 | Variable | Rank of the coordinator |
| Length | 1 | Variable | Length of the availability indication |
| Availability indication | Variable | Variable | Indication for available time block |
| Length | 1 | Variable | Length of the list of the supported rate |
| List of Supported Rate | Variable | Variable | A list of rate supported by the service |
| Length | 1 | Variable | Length of the list of the devices |
| List of devices | Variable | Variable | A list of devices in the multicast group |

In other embodiments, the scheduling attribute of Table 1 may include any other structure and/or format, and/or may include any other different and/or additional fields.

In some demonstrative embodiments, one or more filed of the scheduling attribute of Table 1 may be included as part of, and/or together with, one or more messages, frames and/or attributes configured for multicast communication, for example, a cant-connect attribute, a multicast group attribute, and/or an election attribute, e.g., as described below.

In some demonstrative embodiments, controller 124 may be configured to control, cause and/or trigger device 102 to determine a scheduling rank of device 102, for example, based on one or more messages from devices of the multicast group. For example, controller 124 may be configured to control, cause and/or trigger device 102 to determine the scheduling rank of device 102, for example, based on one or more messages from devices 160 and/or 180 from multicast group 129.

In some demonstrative embodiments, controller 124 may be configured to control, cause and/or trigger device 102 and/or transmitter 118 to transmit one or more messages including the scheduling rank of device 102.

In some demonstrative embodiments, the scheduling rank may be determined, for example, in accordance with one or more rules, e.g., as described below.

In some demonstrative embodiments, according to a first rule, a device, denoted "device A", may not have a lower scheduling rank than another device, denoted "device B", sharing a same service, for example, if the device A perceives it can form a multicast group with a first number of devices sharing the same service, device B perceives it can form a multicast group with a second number of devices sharing the same service, and the first number of devices is greater than the second number of devices.

In some demonstrative embodiments, the Device A may be configured to perceive that all devices, which device A can hear, can hear each other.

In some demonstrative embodiments, the Device A may be configured to update its knowledge of whether or not the devices, that the device A can hear, may hear each another, for example, by overhearing frame transmissions from the other devices, for example, including one or more of election frame transmissions, multicast group frame transmissions, and/or cant-connect frame transmissions, e.g., as described below. In one example, the ability to update the knowledge of whether other devices may hear each another may be relevant, for example, in a case in which the Device A can hear only some, but not all, of the other devices sharing the same service, e.g., due to mobility of the other devices.

In some demonstrative embodiments, according to a second rule, if two devices are connected to the same number of other devices sharing the same service, a device of the two devices, which has more constraints, e.g., with respect to power, number of connections, and/or any other criterion, may have a higher rank.

In other embodiments, any other rule, criterion and/or mechanism may be applied to determine the scheduling rank of a device.

In some demonstrative embodiments, controller 124 may be configured to control, cause and/or trigger device 102 and/or transmitter 118 to transmit a message including the scheduling attribute.

In some demonstrative embodiments, device 102 may be configured to send the message including the scheduling attribute to the devices of multicast group 129, for example, during one or more DWs, for example, during each DW, of NAN cluster 109 including the devices of the multicast group 129.

In some demonstrative embodiments, the message including the scheduling attribute may also include a group update element to indicate at least one scheduled timeblock to communicate updated group information, e.g., corresponding to multicast group 129.

In one example, the message may include the multicast group update element, for example, representing additional time blocks, during which all devices of multicast group 129 may be available for updating group information, for example, adding or removing devices from the multicast group, updating a scheduling rank, and/or updating a schedule for group members of multicast group 129.

In some demonstrative embodiments, controller 124 may be configured to control, cause and/or trigger device 102 to connect with one or more NAN devices of the multicast group 129, for example, during at least one of the timeblocks, e.g., to communicate traffic of the service.

In one example, controller 124 may be configured to control, cause and/or trigger device 102 to connect with the one or more NAN devices, for example, during at least one scheduled timeblock, for example, to communicate updated group information, for example, if the multicast group information of multicast group 129 is updated.

In some demonstrative embodiments, controller 124 may be configured to control, cause and/or trigger device 102 to connect with all NAN devices of the multicast group 129, for example, during at least one of the timeblocks to communicate traffic of the service.

In some demonstrative embodiments, the message including the scheduling attribute may include a Service Discovery Frame (SDF), a dedicated Publish Action Frame, or any other type of message.

In some demonstrative embodiments, device 140 may be configured to listen for messages transmitted by a coordinator of a multicast group, e.g. during a DW of the DWs on NAN cluster 109, for example, if device 140 whishes to join the multicast group, e.g., to share the service of the multicast group.

For example, device 140 may be configured to listen for messages transmitted by the coordinator of multicast group 129, e.g., device 102, for example, if device 140 wishes to share the service provided by multicast group 129, e.g., a service provided by application 125 or application 126.

In some demonstrative embodiments, controller 154 may be configured to control, cause and/or trigger device 140 and/or receiver 146 to process reception of the message including the scheduling attribute from the coordinator of multicast group 129, e.g., device 102.

In one example, controller 154 may be configured to control, cause and/or trigger device 140 and/or receiver 146 to process reception of an SDF or a dedicated Publish Action Frame including the scheduling attribute from device 102.

In some demonstrative embodiments, controller 154 may be configured to control, cause and/or trigger device 140 to connect with one or more NAN devices of multicast group 129, e.g., during at least one of the timeblocks, to communicate traffic of the service of multicast group 129.

In some demonstrative embodiments, controller 154 may be configured to control, cause and/or trigger device 140 to connect with all NAN devices of the multicast group 129 during the at least one of the timeblocks, e.g., to communicate traffic of the service.

In some demonstrative embodiments, device 140 may be configured to wake up, for example, in one of the time blocks announced in the Further Availability Bitmap, e.g., in the SDF or in the dedicated Publish Action Frame, or in the multicast group update element in the message including the Scheduling attribute, for example, to set up multicast connections with devices of multicast group 129.

In one example, device 140 may be configured to connect with the multicast group 129, for example, by setting up a single connection with device 102, e.g., the coordinator of multicast group 129, or by setting up separate connections with every device in the multicast group 129, e.g., with device 160 and with device 180.

Figure 2:
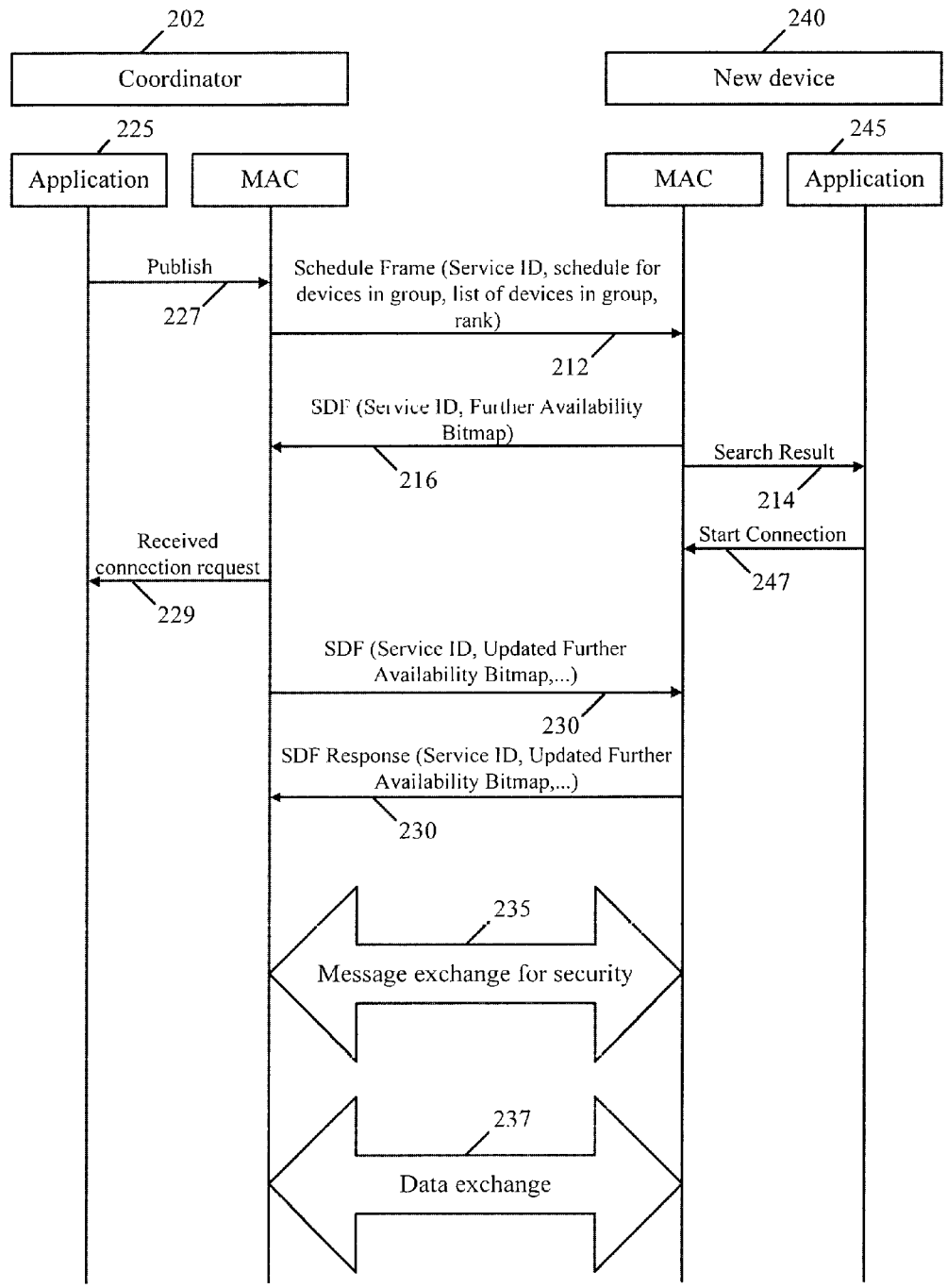
FIG. 2 is a sequence diagram of operations between a coordinator of a group and a device joining the group, in accordance with some demonstrative embodiments.

Reference is made to FIG. 2, which schematically illustrates a sequence diagram 200 of operations between a coordinator 202 ("Coordinator") of a multicast group and a device 240 ("New Device") joining the multicast group, in accordance with some demonstrative embodiments. For example, device 102 (FIG. 1) may perform the functionality of the coordinator 202, and/or device 140 may perform the functionality of the device 240.

In some demonstrative embodiments, one or more of the operations of FIG. 2 may be performed, for example, to setup a new multicast connection between device 240 and coordinator 202, e.g., as described below.

In some demonstrative embodiments, a device, e.g., one device, of a multicast group of NAN devices, e.g., multicast group 129 (FIG. 1), may be configured to perform the functionality of coordinator 202 to coordinate at least one timeblock, e.g., including at least one time slot and at least one channel, over which an exchange of the multicast traffic within the multicast group may be performed.

In some demonstrative embodiments, as shown in FIG. 2, an application 225 may publish (227) a service to be provided to the multicast group. For example, application 225 may perform the functionality of application 125 (FIG. 1).

In some demonstrative embodiments, the coordinator 202 may be configured to announce a schedule, e.g., to be used to exchange data for the service, for example, for every device in the multicast group.

In some demonstrative embodiments, as shown in FIG. 2, the coordinator 202 may announce the schedule using a schedule frame 212, e.g., as described below.

In some demonstrative embodiments, as shown in FIG. 2, schedule frame 212 may include a service ID, scheduling information of the service, an indication of the list of devices in the multicast group, and/or a scheduling rank element.

In one example, device 140 (FIG. 1) may receive schedule frame 212 from device 102 (FIG. 1), and based on schedule frame 212 may join multicast group 129 (FIG. 1).

In some demonstrative embodiments, as shown in FIG. 2, device 240 may receive schedule frame 212, and may update (214) an application 245 of device 240 with a search result indicating a service provided by application 225. For example, application 245 may perform the functionality of application 145 (FIG. 1).

In some demonstrative embodiments, as shown in FIG. 2, application 245 may request (247) device 240 to start a connection with the service provided by application 225.

In some demonstrative embodiments, as shown in FIG. 2, device 240 may send an SDF 216 to request to connect to the service of the multicast group, e.g., provided by application 225.

In some demonstrative embodiments, coordinator 202 may be configured to reject the connection with device 202, for example, if data rates supported by or available timeblocks available to device 202 may not be compatible with the service, or for any other reason.

In some demonstrative embodiments, as shown in FIG. 2, coordinator 202 may provide (229) the connection request, e.g., from application 245, to application 225. In some demonstrative embodiments, as shown in FIG. 2, devices 202 and 240 may exchange SDFs 230 to update a further availability bitmap, for example, to define done or more time slots and/or channels to be used to exchange data between applications 225 and 245.

In some demonstrative embodiments, as shown in FIG. 2, devices 202 and 240 may exchange one or more security messages 235.

In some demonstrative embodiments, as shown in FIG. 2, devices 202 and 240 may exchange data 237 between applications 225 and 245, for example, based on the schedule information, e.g., in schedule frame 212 and/or the updated further availability bitmap, e.g., in SDFs 230.

Referring back to FIG. 1, in some demonstrative embodiments, a NAN device of a multicast group, e.g., one or more of devices 102, 140, 160 and/or 180, may be configured to perform one or more operations, and/or to communicate one or more messages, for example, to maintain and/or update the multicast group.

In some demonstrative embodiments, the NAN device, e.g., one or more of devices 102, 140, 160 and/or 180, may be configured to update the scheduling rank information, for example, on new connection setup.

In some demonstrative embodiments, the coordinator of multicast group 129, e.g., device 102, or another device of multicast group 129, may be configured to reject a connection with a new device, for example, if data rates supported by or available timeblocks available to the new device may not be compatible with the service provided in the multicast group 129, or for any other reason.

In some demonstrative embodiments, a NAN device of multicast group 129, e.g., device 102, may be configured to update the scheduling rank information of the NAN device, for example, upon setting up connection with another NAN device, e.g., NAN device 140, e.g., as described above.

In some demonstrative embodiments, device 102 may be configured to send the scheduling attribute, for example, on new connection setup.

In some demonstrative embodiments, a device of multicast group 129, e.g., device 102, may be configured to transmit a message including a scheduling attribute, for example, upon setting up a connection with another NAN device joining to the multicast group 129, e.g., device 140.

In some demonstrative embodiments, device 102 may be configured to send a message including the scheduling attribute of multicast group 129, for example, upon setting up the connection with device 140.

In some demonstrative embodiments, controller 124 may be configured to control, cause and/or trigger device 102 to send a message including the scheduling attribute of multicast group 129, for example, upon setting up the connection with device 140.

In some demonstrative embodiments, device 140 may be configured to receive a message, e.g., from device 102, including the scheduling attribute of multicast group 129, for example, upon device 102 setting up a connection with another NAN device belonging to the multicast group 129.

In some demonstrative embodiments, controller 154 may be configured to control, cause and/or trigger device 140 to process reception of a message including the scheduling attribute of multicast group 129, for example, upon device 102 setting up a connection with device 160 of multicast group 129.

In some demonstrative embodiments a device of multicast group 129, e.g., device 140, may be configured to announce, update, and/or signal, for example, that the device is to leave the multicast group.

In some demonstrative embodiments, device 140 may be configured to announce to the coordinator of the multicast group, e.g., device 102, that device 140 is to leave multicast group 129.

In some demonstrative embodiments, device 140 may be configured to announce any other device of multicast group 129, for example, a device which is not the coordinator of the multicast group, e.g., device 160, that device 140 is to leave multicast group 129.

In one example, device 140 may leave the multicast group, for example, by informing, e.g., by transmitting an SDF, to the multicast group coordinator and/or to one or more other devices with whom device 140 is involved in a session.

In some demonstrative embodiments, controller 154 may be configured to control, cause and/or trigger device 140 to transmit a leave message to indicate that device 140 is to leave the multicast group 129.

In some demonstrative embodiments, device 102 may receive the leave message from device 140.

In some demonstrative embodiments, controller 124 may be configured to control, cause and/or trigger device 102 to process reception of the leave message indicating that the device 140 is to leave the multicast group 129.

In some demonstrative embodiments, devices of the multicast group 129 may be configured to update their scheduling ranks and list of group addresses, for example, when receiving the leave message from a device, e.g., device 140, leaving the multicast group 129.

In some demonstrative embodiments, if a NAN device leaving the multicast group 129 is the coordinator of the multicast group, the remaining devices of the multicast group 129 may elect a new coordinator, e.g., as described below.

In some demonstrative embodiments, a device of multicast group 129, e.g., device 140, may be configured to announce, update, and/or signal, for example, an activity state of the device.

In some demonstrative embodiments, device 140 may be configured to transmit a refresh message, e.g., at least every predefined interval ("refresh interval") to indicate the device 140 is active. The refresh interval may be determine and/or set, for example, by the coordinator of multicast group 129, e.g., device 102. For example, the coordinator may include an indication of the refresh interval in the scheduling attribute, e.g., according to Table 1.

In some demonstrative embodiments, device 140 may transmit the refresh message to the coordinator of the multicast group, e.g., device 102, to indicate device 140 is active.

In some demonstrative embodiments, controller 154 may be configured to control, cause and/or trigger device 140 to transmit the refresh message at least every refresh interval, e.g., the refresh interval of Table 1, to indicate device 140 is active.

In some demonstrative embodiments, device 102 may be configured to receive the refresh message from device 140, and, accordingly, to be aware that device 140 is active.

In some demonstrative embodiments, controller 124 may be configured to control, cause and/or trigger device 102 to process reception of the refresh message indicating that the device 140 is still active.

In some demonstrative embodiments, a device in multicast group 129, which does not hear and/or receive the refresh message from another device of the multicast group 129, for example, for a predefined period ("the activity detection period"), may determine that the other device left the multicast group 129. For example, the activity detection period may be defined as a multiple of the refresh interval.

In some demonstrative embodiments, if device 102 does not hear and/or receive any transmission from device 140, e.g., for the activity detection period, device 102 may determine that device 140 left the multicast group.

In some demonstrative embodiments, if any transmission or refresh messages are not received from the coordinator of the multicast group, e.g., for at least the activity detection period, then the remaining devices of the multicast group may elect a new coordinator, e.g., as described below.

In some demonstrative embodiments, a device of multicast group 129, e.g., device 140, may be configured to announce, update, and/or signal, for example, a connectivity state with one or more other NAN devices of multicast group 129.

In some demonstrative embodiments, device 140 may be configured to transmit to the coordinator of the multicast group 129 a message including a cant-connect attribute indicating one or more other NAN devices of the multicast group 129, e.g., device 160, for example, if a refresh message is not received from device 160 of the multicast group 129 for the activity detection period.

In some demonstrative embodiments, device 140 may be configured to transmit to the coordinator of the multicast group 129 a message including a cant-connect attribute indicating a list of one or more other NAN devices of the multicast group 129, e.g., devices 160 and 180, for example, if device 140 does not receive a refresh message from devices 160 and 180 of the multicast group 129 for at least the activity detection period.

Some demonstrative embodiments are described herein with respect to a cant-connect attribute, e.g., as described below. In other embodiments, one or more elements of the cant-connect attribute may be communicated in any other format, for example, as part of a frame, message, information element, field, and the like.

In some demonstrative embodiments, device 140 may be configured to transmit to the coordinator of the multicast group 129, e.g., device 102, a message including the cant-connect attribute indicating device 160, for example, if device 140 does not receive from device 160 a refresh message for the activity detection period, In some demonstrative embodiments, device 102 may be configured to receive the message including the cant-connect attribute including an indication of device 160, and may be aware that device 140 did not receive the refresh message from device 160, e.g., for the activity detection period.

In some demonstrative embodiments, controller 124 may be configured to control, cause and/or trigger device 102 to process reception of the message, and, based on the cant-connect attribute including the indication of device 160, to determined that a refresh message from device 160 was not received at device 140 for the activity detection period.

In some demonstrative embodiments, the cant-connect attribute may include one or more fields, e.g., as follows.

TABLE 2

| Field | Size | Value | Description |
|---|---|---|---|
| Attribute ID | 1 | TBD | Identifies the type of NAN attribute, e.g., multicast attribute. |

TABLE 2-continued

| Field | Size | Value | Description |
|---|---|---|---|
| Type | 1 | Variable | Indicate the type of the attribute, e.g., Cant-connect |
| Length | 1 | Variable | Length of the list of the devices |
| List of devices | Variable | Variable | A list of devices that the device can not hear |

For example, the list of devices in Table 2 may include a list of identifiers, for example, a list of MAC addresses, of the devices, which belong to the multicast group, and from which a refresh message has not been received for at least the activity detection period. In other embodiments, the list of devices may include and/or may be in any other format, e.g., using bloom filters.

In other embodiments, the cant connect attribute of Table 2 may include any other structure and/or format, and/or may include any other different and/or additional fields.

In some demonstrative embodiments, if a message including the cant-connect attribute includes an indication of the coordinator of the multicast group 129, e.g., in the list of devices, then the remaining devices of the multicast group 129 may elect a new coordinator, e.g., as described below.

In some demonstrative embodiments, devices 102, 140, 160 and/or 180 may be configured to perform one or more operations for removing a connection, e.g., as described below.

In some demonstrative embodiments, the coordinator of the multicast group 129, e.g., device 102, may be configured to remove, terminate, stop and/or disconnect another NAN device of the multicast group 129, for example, if one or more devices of the multicast group 129 indicate that the other NAN device has left the multicast group, e.g., as described above.

In some demonstrative embodiments, a device of multicast group 129, e.g., device 102, may be configured to remove, terminate, stop and/or disconnect a connection between device 102 and the other NAN device of the multicast group 129, for example, if device 102 determines that the other NAN device has left the multicast group.

In one example, device 102 may determine that the other NAN device has left multicast group 129, for example, if device 102 receives a leave message from the other NAN device, e.g., as described above.

In another example, device 102 may determine that the other NAN device has left multicast group 129, for example, if device 102 does not receive a refresh message from the other NAN device, e.g., for at least the activity detection period, e.g., as described above.

In another example, device 102 may determine that the other NAN device has left multicast group 129, for example, if device 102 receives a message including a cant-connect attribute including an indication of the other NAN device, e.g., as described above.

In some demonstrative embodiments, the coordinator of multicast group 129, e.g., device 102, may be configured to wait for a predefined time period to hear a transmission from a device, which is identified in a cant connect message, for example, before deciding to remove the device from the multicast group.

In some demonstrative embodiments, if the coordinator of the multicast group 129 is determined to have left the multicast group 129, then the remaining devices of the multicast group 129 may elect a new coordinator, e.g., as described below.

In some demonstrative embodiments, the coordinator of the multicast group 129 may be elected, for example, according to a coordinator election criterion, algorithm, scheme and/or procedure, e.g., as described below.

In some demonstrative embodiments, devices 102, 140, 160 and/or 180 may be configured to perform one or more operations to elect, select, and/or determine a coordinator, e.g., a new coordinator, of multicast group 129, e.g., as described below.

In some demonstrative embodiments, devices 102, 140, 160 and/or 180 may be configured to perform one or more operations of a new coordinator election procedure and/or group formation mechanism, e.g., as described below.

In some demonstrative embodiments, a device of multicast group 129, e.g., device 140, may initiate the new coordinator election and/or group formation mechanism, for example, if device 140 determines that the coordinator of multicast group 129 has left the multicast group 129, e.g., as described above.

In one example, device 140 may initiate the new coordinator election procedure, for example, if device 140 terminates a connection with the coordinator of multicast group 129, for example, if device 140 determines that the coordinator of multicast group 129 has left the multicast group 129.

In some demonstrative embodiments, device 140 may initiate the new coordinator election, for example, if a scheduling lank of device 140 has changed.

In some demonstrative embodiments, device 140 may initiate the new coordinator selection procedure, for example, to replace device 102 as the coordinator of the multicast group 129, for example, if a scheduling rank of device 140 has changed, e.g., if the scheduling rank of device 140 is now higher than the scheduling rank of the coordinator of the group.

In some demonstrative embodiments, device 140 may perform the coordinator selection procedure, for example, with other devices of multicast group 129.

In some demonstrative embodiments, the coordinator selection procedure may include a plurality of steps, operations, stages, and/or phases, e.g., as described below.

In some demonstrative embodiments, for example, according to a first coordinator selection operation ("the operation 1") a device of multicast group 129, e.g., device 140, may be configured to update the scheduling rank of device 140, to transmit a message including an election attribute ("the election frame") to initiate the coordinator election procedure.

Some demonstrative embodiments are described herein with respect to an election attribute, e.g., as described below. In other embodiments, one or more elements of the election attribute may be communicated in any other format, for example, as part of a frame, message, information element, field, and the like.

In some demonstrative embodiments, the election attribute may include the scheduling rank of the device transmitting the election frame, for example, device 140, e.g., as described below.

In some demonstrative embodiments, controller 154 may be configured to control, cause and/or trigger device 140 to transmit a message including the election attribute, e.g., including a scheduling rank of device 140, to indicate device 140 is to become the coordinator of the multicast group 129.

In some demonstrative embodiments, the election attribute may include one or more fields, e.g., as follows.

TABLE 3

| Field | Size | Value | Description |
| --- | --- | --- | --- |
| Attribute ID | 1 | TBD | Identifies the type of NAN attribute, e.g., multicast attribute. |
| Type | 1 | Variable | Indicate the type of the attribute, say election |
| Rank | 1 | Variable | Rank of the device |

In other embodiments, the election attribute of Table 3 may include any other structure and/or format, and/or may include any other different and/or additional fields.

In some demonstrative embodiments, the message including the election attribute, e.g., the election frame, may include a cant-connect attribute, e.g., the cant connect attribute of Table 2, indicating devices in the multicast group 129, from which device 140 has not heard and/or receive any messages, for example, for the activity detection period, e.g., as described below. For example, the election attribute may include a cant-connect attribute including an identifier of device 160, for example, if device 140 has not received a refresh message from device 160 for at least the activity detection period.

In some demonstrative embodiments, for example, according to a second coordinator selection operation ("the operation 2") a device of multicast group 129, e.g., device 102, may receive the message including the election attribute, e.g., the election frame, from device 140, and may transmit another election frame, for example, if the device, e.g., device 102, has a higher scheduling rank than the scheduling rank of device 140.

In some demonstrative embodiments, upon hearing and/or receiving the election frame from device 140, a device of multicast group 129, e.g., device 160, having a scheduling rank, which is equal to the scheduling rank of device 140, may transmit another election frame, for example, if device 160 heard a schedule frame transmission from a previous coordinator of multicast group 129, e.g., device 102.

In one example, transmitting the additional election frame from device 160, for example, if the device 160 heard the schedule frame transmission from the previous coordinator of multicast group 129, may enable the previous coordinator, e.g., device 102, to know that a new coordinator election mechanism is undergoing.

In some demonstrative embodiments, device 102 may receive the election frame from device 140, and/or the election frame from device 160.

In some demonstrative embodiments, controller 124 may be configured to control, cause and/or trigger device 102 to receive the message including the election attribute, e.g., the election frame, indicating device 140 of the multicast group 129 is to become the coordinator of the multicast group 129.

In some demonstrative embodiments, controller 124 may be configured to control, cause and/or trigger device 102 to select whether or not to transmit another message including another election attribute to indicate device 102 is to remain the coordinator of the multicast group, for example, based on a comparison between the scheduling rank of device 140 and a scheduling rank of device 102.

In one example, device 102 may send another message ("the additional election message") including an election attribute to indicate device 102 is to remain the coordinator of the multicast group, for example, if the scheduling rank of device 102 is higher than the scheduling rank of device 140, e.g., even after the scheduling rank of device 140 has changed.

In another example, device 102 may select not to transmit the additional election message, for example, if the scheduling rank of device 102 is lower than the scheduling rank of device 140, e.g., after the scheduling rank of device 140 has changed.

In some demonstrative embodiments, for example, according to a third coordinator selection operation ("the operation 3") a device of multicast group 129, e.g., device 160, may be configured to stop sending messages including an election attribute ("election frames") for a fixed time ("the election period"), for example, if device 160 hears an election frame from a device with a higher scheduling rank.

In some demonstrative embodiments, device 160 may transmit another election frame, for example, if device 160 does not hear any message including a scheduling attribute ("schedule frame"), e.g., even after the election period.

In some demonstrative embodiments, device 160 may select to create a new group, for example, by declaring device 160 as the coordinator of the new group, or device 160 may stop trying to join and/or form a multicast group, for example, if device 160 does not hear any schedule frame, e.g., for at least a predefined number of election frame transmissions.

In one example, device 160 may not send a message including an election attribute, for example, if device 160 receives the election frame from device 140 including a scheduling rank, which is higher than a scheduling rank of device 160.

In some demonstrative embodiments, for example, according to a fourth coordinator selection operation ("the operation 4") a device of multicast group 129, e.g., device 180, having a highest scheduling rank may be configured transmit a message ("the mcast_group frame") including a multicast group attribute including tentative multicast group information.

Some demonstrative embodiments are described herein with respect to a multicast group attribute, e.g., as described below. In other embodiments, one or more elements of the multicast group attribute may be communicated in any other format, for example, as part of a frame, message, information element, field, and the like.

In some demonstrative embodiments, the tentative multicast group may include one or more NAN devices, from which one or more refresh messages were received at device 180 within a predefined duration.

In some demonstrative embodiments, device 180 may be configured to wait for a predefined time to hear and/or to receive any election frame from a device with a higher scheduling rank, e.g., before transmitting the mcast_group frame.

In some demonstrative embodiments, the tentative group may include a list of devices that device 180 perceives it can form the tentative multicast group with.

In some demonstrative embodiments, the list of devices may include, for example, a list of MAC addresses identifying the tentative devices.

In other embodiments, the list of devices may include and/or may be in any other format, e.g., using bloom filters.

In some demonstrative embodiments, the multicast group attribute may include one or more fields, e.g., as follows.

TABLE 4

| Field | Size | Value | Description |
| --- | --- | --- | --- |
| Attribute ID | 1 | TBD | Identifies the type of NAN attribute, e.g., multicast attribute. |

TABLE 4-continued

| Field | Size | Value | Description |
| --- | --- | --- | --- |
| Type | 1 | Variable | Indicate the type of the attribute, e.g., MCAST_Group |
| Rank | 1 | Variable | Rank of the device |
| Length | 1 | Variable | Length of the list of the devices |
| List of devices | Variable | Variable | A list of devices that are in the tentative group |

In other embodiments, the multicast group attribute of Table 4 may include any other structure and/or format, and/or may include any other different and/or additional fields.

In some demonstrative embodiments, for example, according to a fifth coordinator selection operation ("the operation 5") a device of multicast group 129, e.g., device 160, which is part of the tentative multicast group may be configured to transmit a message including the cant connect attribute, for example, if device 160 has not heard any transmission, e.g., either data or refresh message, from one or more devices listed in the tentative multicast group included in the multicast group attribute in the message from device 180, for example, for the activity detection period.

In some demonstrative embodiments, the message including the cant connect attribute from device 160 may include a list of identifiers, e.g., MAC addresses, of all devices in the tentative multicast group from which device 160 has not heard any transmission, e.g., either data or refresh message.

In some demonstrative embodiments, device 160 may be configured to transmit the message including the cant connect attribute of device 160, for example, to every device listed in the tentative multicast group, or just to the sender, e.g., device 180, of the message including the multicast group attribute.

In some demonstrative embodiments, device 160 may be configured to select not to transmit the message including the cant connect attribute, for example, if device 160 overheard another device transmitting another message including another cant connect attribute including the same set of devices with whom device 160 cannot connect to, e.g., the devices to be listed in the cant connect attribute from device 160.

In some demonstrative embodiments, device 160 may be configured to determine that device 160 cannot connect to another device, for example, if device 160 does not receive any transmission from the other device for the activity detection period.

In some demonstrative embodiments, for example, according to a sixth coordinator selection operation ("the operation 6") the device of multicast group 129 forming the tentative multicast group, e.g., device 180, may be configured to collect messages including the cant connect attributes from other devices in the tentative multicast group, e.g., during the a predefined period.

In some demonstrative embodiments, device 180 may be configured to update the list of all devices that can be in the tentative multicast group, e.g., including device 180, as well as a scheduling rank of device 180, for example, using information collected from the cant connect attributes received from one or more devices in the tentative multicast group.

In some demonstrative embodiments, devices of the updated tentative multicast group may be able to communicate with all other NAN devices of the tentative multicast group.

In some demonstrative embodiments, the updated list of all devices in the tentative multicast group may include, for example, only devices which can all transmit to each other within the tentative multicast group, e.g., using the information collected from the messages including the cant connect attributes.

In some demonstrative embodiments, device 180 may be configured to update the scheduling rank of device 180 for a service, for example, based on the number of devices in the updated list of the tentative multicast group.

In some demonstrative embodiments, device 180 may be configured to transmit a new election frame, for example, including the updated scheduling rank of device 180, for example, to devices in the updated multicast group of the tentative multicast group.

In some demonstrative embodiments, device 180 may be configured to repeat one or more of the operations 1-6, for example, to maintain and/or update the tentative multicast group.

In some demonstrative embodiments, device 180 may be configured to become the coordinator of the tentative multicast group, and to transmit a message including a scheduling attribute including a list of the one or more NAN devices of the tentative multicast group.

In some demonstrative embodiments, for example, according to a seventh coordinator selection operation ("the operation 7") a new coordinator may be selected, for example, if the device transmitting the multicast group message, e.g., device 180, does not receive any cant connect message, e.g., as described below.

In some demonstrative embodiments, the device transmitting the multicast group message, e.g., device 180, may be configured to declare itself as the new coordinator, for example, if the device transmitting the multicast group message, e.g., device 180, does not receive any cant connect message, and, for example, if device 180 does not hear and/or receive any transmission from the old coordinator, and/or if the scheduling rank of device 180 is higher than a scheduling rank of any other peer device in the multicast tentative group.

In some demonstrative embodiments, the old coordinator, e.g., device 102, may continue to remain the coordinator of multicast group 129, for example, if device 180 does hear and/or receive a transmission from the old coordinator, and/or if the scheduling rank of device 180 is not higher than the scheduling rank of any other peer device in the multicast tentative group.

In one example, only devices listed in the multicast group attribute transmitted from device 180 may be allowed to participate in subsequent multicast data transmissions, e.g., of the tentative multicast group.

In some demonstrative embodiments, only devices that are active subscribers or unsolicited publishers of a service may be coordinators, e.g., and consequently transmit election frames.

In some demonstrative embodiments, the multicast group attribute, the cant connect attribute, and/or the election attribute may be communicated in a message in the form of a new SDF, a new public action frame, and/or as part of or in the form of any other type of frame and/or message.

Figure 3A:
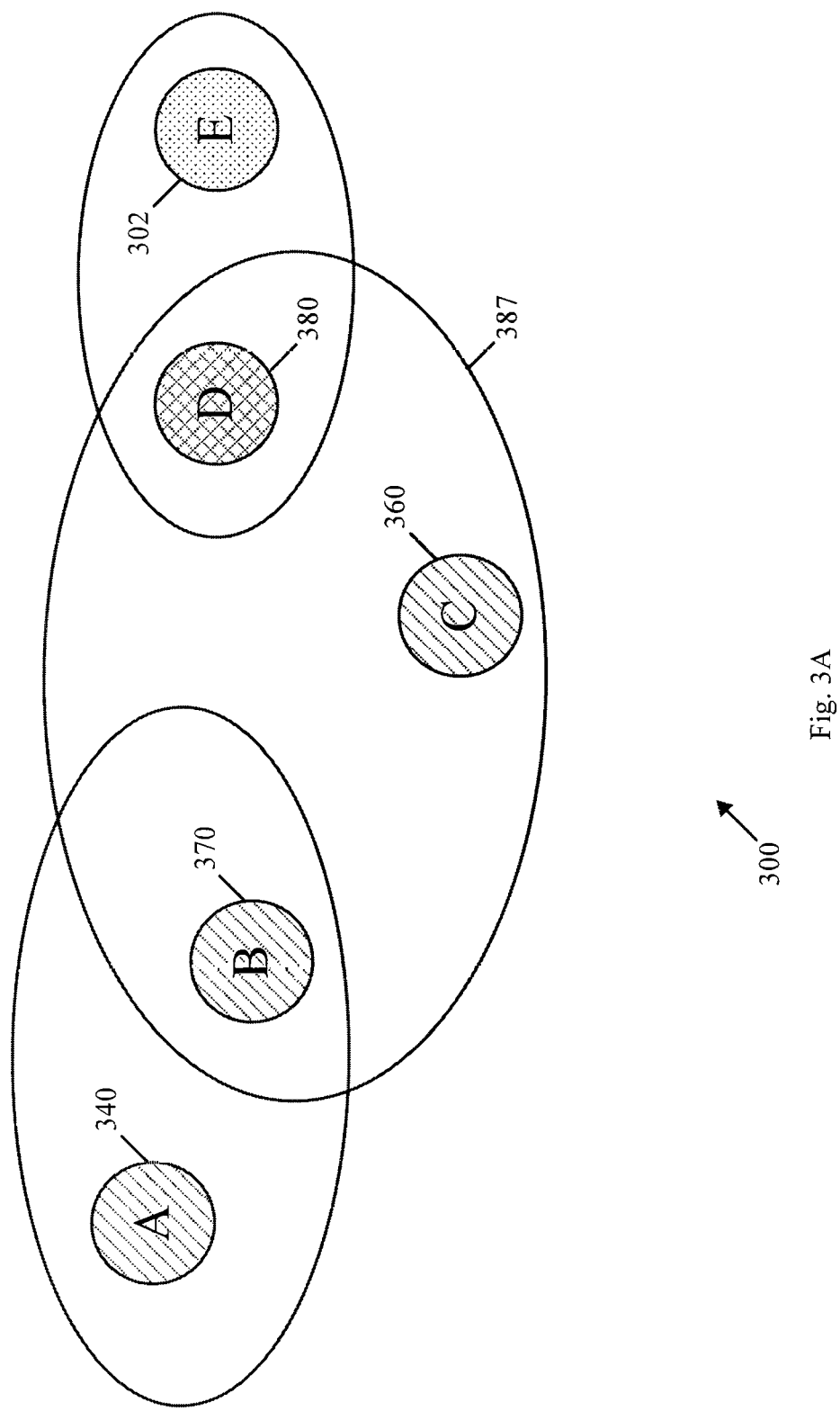
FIG. 3A is a schematic illustration of a network topology of a plurality of wireless communication devices, in accordance with some demonstrative embodiments.
Figure 3B:
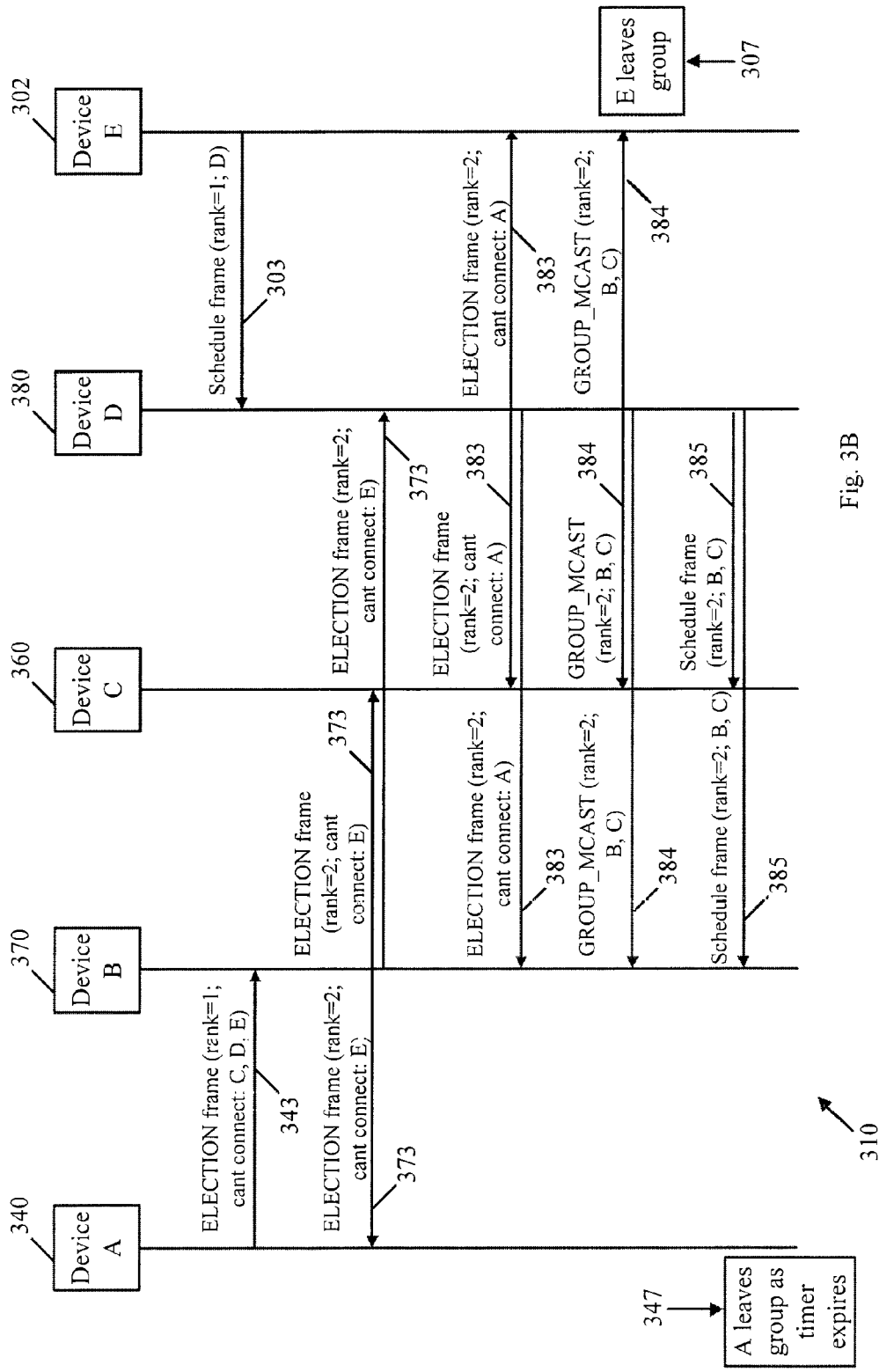
FIG. 3B is a sequence diagram of operations between the plurality of wireless communication devices of the network topology of FIG. 3A, in accordance with some demonstrative embodiments.

Reference is made to FIG. 3A which schematically illustrates a network topology 300 including a plurality of wireless communication devices, and to FIG. 3B, which schematically illustrates a sequence diagram 310 of operations between the plurality of wireless communication devices of the network topology of FIG. 3A, in accordance with some demonstrative embodiments.

As shown in FIG. 3A, network topology 300 may include five devices, e.g., a first device 340, denoted Device A, a second device 370, denoted Device B, a third device 360, denoted Device C, a fourth device 380, denoted Device D, and/or a fifth device 302, denoted Device E. For example, one or more of the devices of FIG. 3A may perform the functionality of one or more devices of the system 100 (FIG. 1)

In some demonstrative embodiments, devices 302, 340, 360, 370 and 380 may initially belong to an initial multicast group.

In some demonstrative embodiments, device 302 may be the coordinator of the initial multicast group. For example, device 302 may perform the functionality of device 102 (FIG. 2).

In some demonstrative embodiments, device 380 may have a highest scheduling rank. For example, device 380 may perform the functionality of device 180 (FIG. 2).

In some demonstrative embodiments, one or more of the operations of FIG. 3B may be performed as part of the New coordinator election procedure, e.g., as described above.

For example, the one or more of the operations of FIG. 3B may be performed to replace the device 302 with a new coordinator.

In some demonstrative embodiments, as shown in FIG. 3B, device 302, e.g., as the coordinator of the initial multicast group, may transmit a message 303 including a schedule attribute including a rank of device 302, and a list of devices including device 380.

In some demonstrative embodiments, as shown in FIG. 3B, device 340, may transmit a message 343 including an election attribute including a rank of device 340 and a cant connect attribute indicating devices 360, 380 and 302, for example, if device 340 did not receive a refresh message from devices 360, 380 and 302, e.g., during the activity detection period. In one example, device 340 may initiate an election of the coordinator, by sending message 343 including the election attribute, for example, if connection between device 340 and the coordinator of the initial multicast group, e.g., device 302, terminates, and/or if device 340 determines that device 302 has left the multicast group for one or more reasons, e.g., as described above.

In some demonstrative embodiments, as shown in FIG. 3B, device 370 may receive message 343 including the election attribute, and device 370 may compare a scheduling rank of device 340 to the scheduling rank of device 370.

In some demonstrative embodiments, as shown in FIG. 3B, device 370 may transmit messages 373 including an election attribute of device 370 to devices 340, 360 and 380, for example, if the scheduling rank of device 370 is equal to or greater than the scheduling rank of device 340.

In some demonstrative embodiments, as shown in FIG. 3B, messages 373 may include the scheduling rank of device 370 and a cant connect attribute identifying device 302, for example, if device 370 did not receive a refresh message from device 302, e.g., for the activity detection period.

In some demonstrative embodiments, as shown in FIG. 3B, device 380 may receive message 373 including the election attribute of device 370, and may compare the scheduling rank of device 370 to a scheduling rank of device 380.

In some demonstrative embodiments, as shown in FIG. 3B, device 380 may transmit messages 383 including an election attribute of device 380 to devices 302, 360 and 380, for example, if the scheduling rank of device 380 is equal to or greater than the scheduling rank of device 370.

In some demonstrative embodiments, as shown in FIG. 3B, messages 383 may include the scheduling rank of device 380 and a cant connect attribute indicating device 340, for example, if device 380 did not receive a refresh message from device 340, e.g., for the activity detection period.

In some demonstrative embodiments, as shown in FIG. 3B, device 380 may transmit messages 384 including a multicast group attribute of device 380 to devices 302, 360 and 380, for example, if device 380 did not receive any election frame including a scheduling rank greater than the scheduling rank of device 380, e.g., during the election period.

In some demonstrative embodiments, as shown in FIG. 3B, messages 384 may include an indication of a tentative multicast group 387 including devices 360 and 370, which device 380 can hear.

In some demonstrative embodiments, as shown in FIG. 3B, device 302 may leave (307) the multicast group, for example, if device 302 is not included in the tentative multicast group 387 published by device 380.

In one example, device 302 may not be included in the tentative multicast group 387 published by device 380, for example, if device 370 in the tentative multicast group 387 cannot connect with device 302, for example, in order to ensure that each device in a multicast group 387 may be required to communicate with each other device of the multicast group 387.

In some demonstrative embodiments, device 380 may declare itself as the coordinator of the tentative multicast group, e.g., including devices 370, 360 and 380, for example, if any message including a cant-connect attribute and/or an election attribute is not received at device 380.

In some demonstrative embodiments, as shown in FIG. 3B, device 380, e.g., as the coordinator of the tentative multicast group, may transmit a messages 385 to devices of the tentative multicast group, e.g., devices 360 and 370, including a schedule attribute including schedule information for the tentative multicast group 387.

In some demonstrative embodiments, as shown in FIG. 3B, device 340 may leave (347) the multicast group, for example, when a period to receive one or more messages at device 340 has expired.

Figure 4:
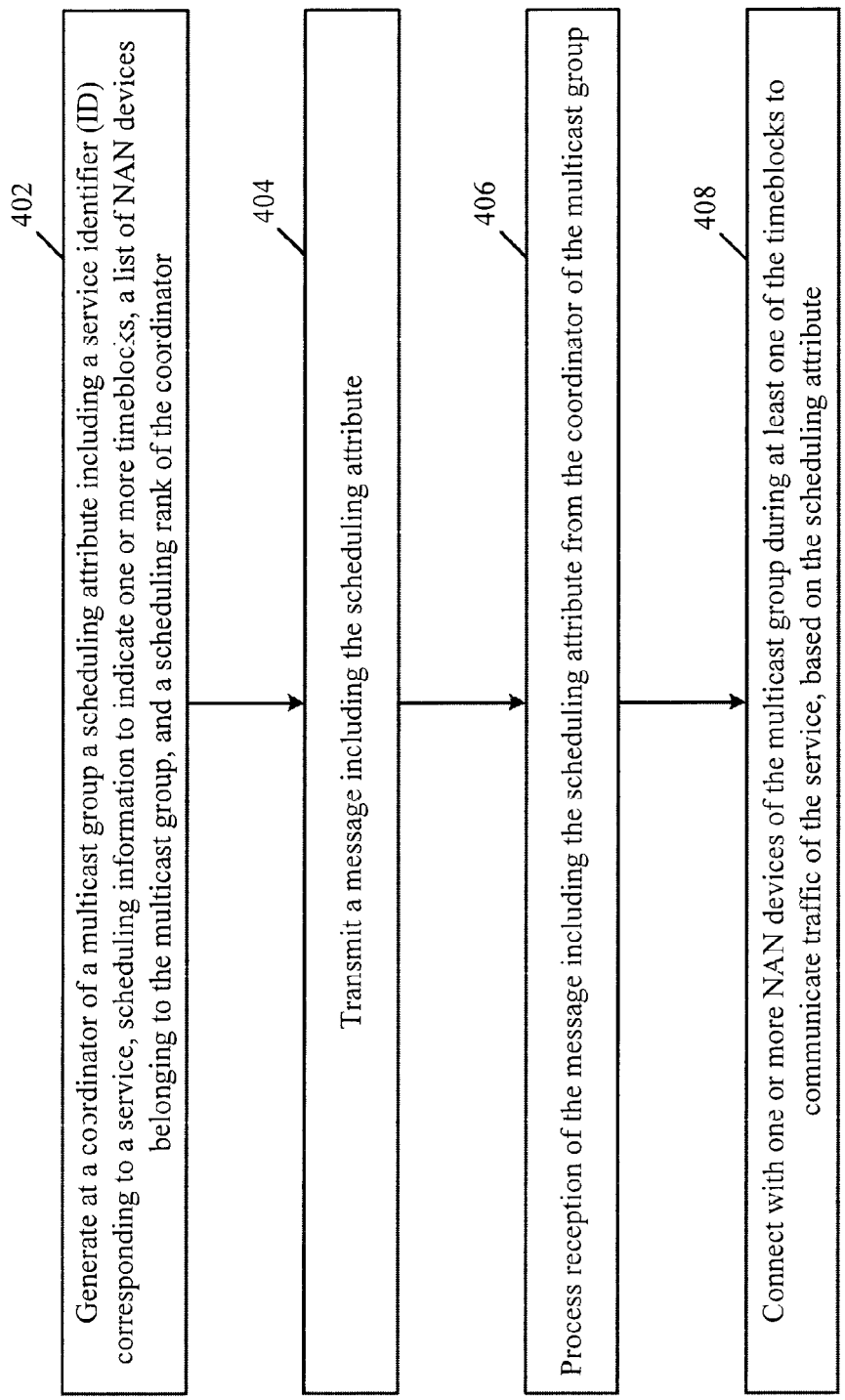
FIG. 4 is a schematic flow-chart illustration of a method of communicating in a multicast group, in accordance with some demonstrative embodiments.

Reference is made to FIG. 4, which schematically illustrates a method of communicating in a multicast group, in accordance with some demonstrative embodiments. For example, one or more of the operations of FIG. 4 may be performed by one or more elements of a system, system 100 (FIG. 1); a device, e.g., wireless communication devices 102, 140, 160 and/or 180 (FIG. 1); a controller, e.g., controller 124 (FIG. 1), and/or controller 154 (FIG. 1); a radio, e.g., radio 114 (FIG. 1); and/or radio 144 (FIG. 1); and/or a message processor, e.g., message processor 128 (FIG. 1) and/or message processor 158 (FIG. 1).

As indicated at block 402, the method may include generating at a coordinator of a multicast group a scheduling attribute including a service identifier (ID) corresponding to a service, scheduling information to indicate one or more timeblocks, a list of NAN devices belonging to the multicast group, and a scheduling rank of the coordinator. For example, controller 124 (FIG. 1) may control, cause and/or trigger device 102 (FIG. 1) to generate the scheduling attribute including the Ill corresponding to the service, the scheduling information to indicate the one or more timeblocks, the list of NAN devices belonging to the multicast group 129 (FIG. 1), and a scheduling rank of device 102 (FIG. 1), e.g., as described above.

As indicated at block 404, the method may include transmitting a message including the scheduling attribute. For example, controller 124 (FIG. 1) may control, cause and/or trigger device 102 (FIG. 1) to transmit the message including the scheduling attribute, e.g., as described above.

As indicated at block 406, the method may include processing at a NAN device reception of a message including the scheduling attribute from the coordinator of the multicast group. For example, controller 154 (FIG. 1) may control, cause and/or trigger device 140 (FIG. 1) to processing reception of the message including the scheduling attribute from device 102 (FIG. 1) as the coordinator of the multicast group 129 (FIG. 1), e.g., as described above.

As indicated at block 408, the method may include connecting with one or more NAN devices of the multicast group during at least one of the timeblocks to communicate traffic of the service, based on the scheduling attribute. For example, controller 154 (FIG. 1) may control, cause and/or trigger device 140 (FIG. 1) to connect with one or more NAN devices of the multicast group 129 (FIG. 1) during at least one of the timeblocks to communicate traffic of the service, based on the scheduling attribute received from device 102 (FIG. 1), e.g., as described above.

Figure 5:
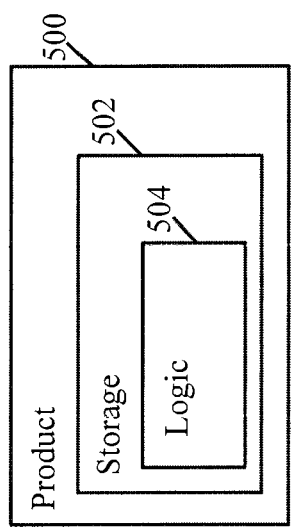
FIG. 5 is a schematic illustration of a product, in accordance with some demonstrative embodiments.

Reference is made to FIG. 5, which schematically illustrates a product of manufacture 500, in accordance with some demonstrative embodiments. Product 500 may include one or more tangible computer-readable non-transitory storage media 502, which may include computer-executable instructions, e.g., implemented by logic 504, operable to, when executed by at least one computer processor, enable the at least one computer processor to implement one or more operations at device 102, device 140, device 160 and/or device 180 (FIG. 1), radio 114 (FIG. 1), transmitter 118 (FIG. 1), receiver 116 (FIG. 1), controller 124, controller 154 (FIG. 1), message processor 128 (FIG. 1), message processor 158 (FIG. 1), and/or to perform, trigger and/or implement one or more operations and/or functionalities described above with respect to the FIGS. 2, 3A, 3B and/or 4, and/or one or more operations described herein. The phrase "non-transitory machine-readable medium" is directed to include all computer-readable media, with the sole exception being a transitory propagating signal.

In some demonstrative embodiments, product 500 and/or machine-readable storage medium 502 may include one or more types of computer-readable storage media capable of storing data, including volatile memory, non-volatile memory, removable or non-removable memory, erasable or non-erasable memory, writeable or re-writeable memory, and the like. For example, machine-readable storage medium 502 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative embodiments, logic 504 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative embodiments, logic 504 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

EXAMPLES

The following examples pertain to further embodiments.

Example 1 includes an apparatus comprising a memory and a processor, the processor configured to cause a Neighbor Awareness Networking (NAN) device to process reception of a message comprising a scheduling attribute from a coordinator of a multicast group, the scheduling attribute comprising a service identifier (ID) corresponding to a service, scheduling information to indicate one or more timeblocks, a list of NAN devices belonging to the multicast group, and a scheduling rank of the coordinator; and based on the scheduling attribute, connect with one or more NAN devices of the multicast group during at least one of the timeblocks to communicate traffic of the service.

Example 2 includes the subject matter of Example 1, and optionally, wherein the processor is configured to cause the NAN device to determine the scheduling rank of the NAN device based on one or more messages from devices of the multicast group, and to transmit one or more messages comprising the scheduling rank of the NAN device.

Example 3 includes the subject matter of Example 1 or 2, and optionally, wherein the processor is configured to cause the NAN device to transmit a refresh message at least every refresh interval to indicate the NAN device is active.

Example 4 includes the subject matter of any one of Examples 1-3, and optionally, wherein the processor is configured to cause the NAN device to transmit to the coordinator a message comprising a cant-connect attribute indicating another NAN device of the multicast group, if a refresh message is not received from the another NAN device of the multicast group for a predefined duration.

Example 5 includes the subject matter of any one of Examples 1-4, and optionally, wherein the processor is configured to cause the NAN device to transmit a message comprising an election attribute to indicate the NAN device is to become the coordinator, the election attribute comprising a scheduling rank of the NAN device.

Example 6 includes the subject matter of Example 5, and optionally, wherein the election attribute comprises a cant-connect attribute indicating one or more NAN devices of the multicast group, from which a refresh message is not received for a predefined duration.

Example 7 includes the subject matter of Example 5 or 6, and optionally, wherein the processor is configured to cause the NAN device to transmit a message comprising a multicast group attribute indicating a tentative multicast group comprising one or more NAN devices, from which one or more refresh messages were received within a predefined duration.

Example 8 includes the subject matter of Example 7, and optionally, wherein each of the one or more NAN devices of the tentative multicast group is able to communicate with all NAN devices of the tentative multicast group.

Example 9 includes the subject matter of Example 7 or 8, and optionally, wherein the processor is configured to cause the NAN device to become a coordinator of the tentative multicast group, and to transmit a message comprising another scheduling attribute comprising a list of the one or more NAN devices of the tentative multicast group.

Example 10 includes the subject matter of any one of Examples 1-9, and optionally, wherein the processor is configured to cause the NAN device to receive a first message comprising a first election attribute indicating another NAN device of the multicast group is to become the coordinator of the multicast group, the election attribute comprising a scheduling rank of the another NAN device, and, based on a comparison between the scheduling rank of the another NAN device and a scheduling rank of the NAN device, to select to become the coordinator of the multicast group and to transmit a second message comprising a second election attribute to indicate the NAN device is to become the coordinator of the multicast group.

Example 11 includes the subject matter of any one of Examples 1-10, and optionally, wherein the processor is configured to cause the NAN device to connect with all NAN devices of the multicast group during the at least one of the timeblocks to communicate traffic of the service.

Example 12 includes the subject matter of any one of Examples 1-11, and optionally, wherein the processor is configured to cause the NAN device to transmit a leave message to indicate that the NAN device is to leave the multicast group.

Example 13 includes the subject matter of any one of Examples 1-12, and optionally, wherein the scheduling attribute comprises a group update element to indicate at least one scheduled timeblock to communicate updated group information.

Example 14 includes the subject matter of any one of Examples 1-13, and optionally, wherein the processor is configured to cause the NAN device to process reception of the scheduling attribute upon setting up a connection with the coordinator or with another NAN device belonging to the multicast group.

Example 15 includes the subject matter of any one of Examples 1-14, and optionally, wherein the message comprising the scheduling attribute comprises a Service Discovery Frame (SDF) or a dedicated Publish Action Frame.

Example 16 includes the subject matter of any one of Examples 1-15, and optionally, wherein the multicast group comprises a many-to-many group.

Example 17 includes the subject matter of any one of Examples 1-16, and optionally, comprising a radio.

Example 18 includes the subject matter of any one of Examples 1-17, and optionally, comprising one or more antennas.

Example 19 includes a system of wireless communication comprising a Neighbor Awareness Networking (NAN) device, the NAN device comprising one or more antennas; a memory; and a processor configured to cause the NAN device to process reception of a message comprising a scheduling attribute from a coordinator of a multicast group, the scheduling attribute comprising a service identifier (ID) corresponding to a service, scheduling information to indicate one or more timeblocks, a list of NAN devices belonging to the multicast group, and a scheduling rank of the coordinator; and based on the scheduling attribute, connect with one or more NAN devices of the multicast group during at least one of the timeblocks to communicate traffic of the service.

Example 20 includes the subject matter of Example 19, and optionally, wherein the processor is configured to cause the NAN device to determine the scheduling rank of the NAN device based on one or more messages from devices of the multicast group, and to transmit one or more messages comprising the scheduling rank of the NAN device.

Example 21 includes the subject matter of Example 19 or 20, and optionally, wherein the processor is configured to cause the NAN device to transmit a refresh message at least every refresh interval to indicate the NAN device is active.

Example 22 includes the subject matter of any one of Examples 19-21, and optionally, wherein the processor is configured to cause the NAN device to transmit to the coordinator a message comprising a cant-connect attribute indicating another NAN device of the multicast group, if a refresh message is not received from the another NAN device of the multicast group for a predefined duration.

Example 23 includes the subject matter of any one of Examples 19-22, and optionally, wherein the processor is configured to cause the NAN device to transmit a message comprising an election attribute to indicate the NAN device is to become the coordinator, the election attribute comprising a scheduling rank of the NAN device.

Example 24 includes the subject matter of Example 23, and optionally, wherein the election attribute comprises a cant-connect attribute indicating one or more NAN devices of the multicast group, from which a refresh message is not received for a predefined duration.

Example 25 includes the subject matter of Example 23 or 24, and optionally, wherein the processor is configured to cause the NAN device to transmit a message comprising a multicast group attribute indicating a tentative multicast group comprising one or more NAN devices, from which one or more refresh messages were received within a predefined duration.

Example 26 includes the subject matter of Example 25, and optionally, wherein each of the one or more NAN devices of the tentative multicast group is able to communicate with all NAN devices of the tentative multicast group.

Example 27 includes the subject matter of Example 25 or 26, and optionally, wherein the processor is configured to cause the NAN device to become a coordinator of the tentative multicast group, and to transmit a message comprising another scheduling attribute comprising a list of the one or more NAN devices of the tentative multicast group.

Example 28 includes the subject matter of any one of Examples 19-27, and optionally, wherein the processor is configured to cause the NAN device to receive a first message comprising a first election attribute indicating another NAN device of the multicast group is to become the coordinator of the multicast group, the election attribute comprising a scheduling rank of the another NAN device, and, based on a comparison between the scheduling rank of the another NAN device and a scheduling rank of the NAN device, to select to become the coordinator of the multicast group and to transmit a second message comprising a second election attribute to indicate the NAN device is to become the coordinator of the multicast group.

Example 29 includes the subject matter of any one of Examples 19-28, and optionally, wherein the processor is configured to cause the NAN device to connect with all NAN devices of the multicast group during the at least one of the timeblocks to communicate traffic of the service.

Example 30 includes the subject matter of any one of Examples 19-29, and optionally, wherein the processor is configured to cause the NAN device to transmit a leave message to indicate that the NAN device is to leave the multicast group.

Example 31 includes the subject matter of any one of Examples 19-30, and optionally, wherein the scheduling attribute comprises a group update element to indicate at least one scheduled timeblock to communicate updated group information.

Example 32 includes the subject matter of any one of Examples 19-31, and optionally, wherein the processor is configured to cause the NAN device to process reception of the scheduling attribute upon setting up a connection with the coordinator or with another NAN device belonging to the multicast group.

Example 33 includes the subject matter of any one of Examples 19-32, and optionally, wherein the message comprising the scheduling attribute comprises a Service Discovery Frame (SDF) or a dedicated Publish Action Frame.

Example 34 includes the subject matter of any one of Examples 19-33, and optionally, wherein the multicast group comprises a many-to-many group.

Example 35 includes the subject matter of any one of Examples 19-34, and optionally, wherein the NAN device comprises a radio.

Example 36 includes a method to be performed at a Neighbor Awareness Networking (NAN) device, the method comprising processing reception of a message comprising a scheduling attribute from a coordinator of a multicast group, the scheduling attribute comprising a service identifier (ID) corresponding to a service, scheduling information to indicate one or more timeblocks, a list of NAN devices belonging to the multicast group, and a scheduling rank of the coordinator; and based on the scheduling attribute, connecting with one or more NAN devices of the multicast group during at least one of the timeblocks to communicate traffic of the service.

Example 37 includes the subject matter of Example 36, and optionally, comprising determining the scheduling rank of the NAN device based on one or more messages from devices of the multicast group, and transmitting one or more messages comprising the scheduling rank of the NAN device.

Example 38 includes the subject matter of Example 36 or 37, and optionally, comprising transmitting a refresh message at least every refresh interval to indicate the NAN device is active.

Example 39 includes the subject matter of any one of Examples 36-38, and optionally, comprising transmitting to the coordinator a message comprising a cant-connect attribute indicating another NAN device of the multicast group, if a refresh message is not received from the another NAN device of the multicast group for a predefined duration.

Example 40 includes the subject matter of any one of Examples 36-39, and optionally, comprising transmitting a message comprising an election attribute to indicate the NAN device is to become the coordinator, the election attribute comprising a scheduling rank of the NAN device.

Example 41 includes the subject matter of Example 40, and optionally, wherein the election attribute comprises a cant-connect attribute indicating one or more NAN devices of the multicast group, from which a refresh message is not received for a predefined duration.

Example 42 includes the subject matter of Example 40 or 41, and optionally, comprising transmitting a message comprising a multicast group attribute indicating a tentative multicast group comprising one or more NAN devices, from which one or more refresh messages were received within a predefined duration.

Example 43 includes the subject matter of Example 42, and optionally, wherein each of the one or more NAN devices of the tentative multicast group is able to communicate with all NAN devices of the tentative multicast group.

Example 44 includes the subject matter of Example 42 or 43, and optionally, comprising becoming a coordinator of the tentative multicast group, and transmitting a message comprising another scheduling attribute comprising a list of the one or more NAN devices of the tentative multicast group.

Example 45 includes the subject matter of any one of Examples 36-44, and optionally, comprising receiving a first message comprising a first election attribute indicating another NAN device of the multicast group is to become the coordinator of the multicast group, the election attribute comprising a scheduling rank of the another NAN device; and based on a comparison between the scheduling rank of the another NAN device and a scheduling rank of the NAN device, selecting to become the coordinator of the multicast group and to transmit a second message comprising a second election attribute to indicate the NAN device is to become the coordinator of the multicast group.

Example 46 includes the subject matter of any one of Examples 36-45, and optionally, comprising connecting with all NAN devices of the multicast group during the at least one of the timeblocks to communicate traffic of the service.

Example 47 includes the subject matter of any one of Examples 36-46, and optionally, comprising transmitting a leave message to indicate that the NAN device is to leave the multicast group.

Example 48 includes the subject matter of any one of Examples 36-47, and optionally, wherein the scheduling attribute comprises a group update element to indicate at least one scheduled timeblock to communicate updated group information.

Example 49 includes the subject matter of any one of Examples 36-48, and optionally, comprising processing reception of the scheduling attribute upon setting up a connection with the coordinator or with another NAN device belonging to the multicast group.

Example 50 includes the subject matter of any one of Examples 36-49, and optionally, wherein the message comprising the scheduling attribute comprises a Service Discovery Frame (SDF) or a dedicated Publish Action Frame.

Example 51 includes the subject matter of any one of Examples 36-50, and optionally, wherein the multicast group comprises a many-to-many group.

Example 52 includes a product comprising one or more tangible computer-readable non-transitory storage media comprising computer-executable instructions operable to, when executed by at least one computer processor, enable the at least one computer processor to implement one or more operations at a Neighbor Awareness Networking (NAN) device, the operations comprising processing reception of a message comprising a scheduling attribute from a coordinator of a multicast group, the scheduling attribute comprising a service identifier (ID) corresponding to a service, scheduling information to indicate one or more timeblocks, a list of NAN devices belonging to the multicast group, and a scheduling rank of the coordinator; and based on the scheduling attribute, connecting with one or more NAN devices of the multicast group during at least one of the timeblocks to communicate traffic of the service.

Example 53 includes the subject matter of Example 52, and optionally, wherein the operations comprise determining the scheduling rank of the NAN device based on one or more messages from devices of the multicast group, and transmitting one or more messages comprising the scheduling rank of the NAN device.

Example 54 includes the subject matter of Example 52 or 53, and optionally, wherein the operations comprise transmitting a refresh message at least every refresh interval to indicate the NAN device is active.

Example 55 includes the subject matter of any one of Examples 52-54, and optionally, wherein the operations comprise transmitting to the coordinator a message comprising a cant-connect attribute indicating another NAN device of the multicast group, if a refresh message is not received from the another NAN device of the multicast group for a predefined duration.

Example 56 includes the subject matter of any one of Examples 52-55, and optionally, wherein the operations comprise transmitting a message comprising an election attribute to indicate the NAN device is to become the coordinator, the election attribute comprising a scheduling rank of the NAN device.

Example 57 includes the subject matter of Example 56, and optionally, wherein the election attribute comprises a cant-connect attribute indicating one or more NAN devices of the multicast group, from which a refresh message is not received for a predefined duration.

Example 58 includes the subject matter of Example 56 or 57, and optionally, wherein the operations comprise transmitting a message comprising a multicast group attribute indicating a tentative multicast group comprising one or more NAN devices, from which one or more refresh messages were received within a predefined duration.

Example 59 includes the subject matter of Example 58, and optionally, wherein each of the one or more NAN devices of the tentative multicast group is able to communicate with all NAN devices of the tentative multicast group.

Example 60 includes the subject matter of Example 58 or 59, and optionally, wherein the operations comprise becoming a coordinator of the tentative multicast group, and transmitting a message comprising another scheduling attribute comprising a list of the one or more NAN devices of the tentative multicast group.

Example 61 includes the subject matter of any one of Examples 52-60, and optionally, wherein the operations comprise receiving a first message comprising a first election attribute indicating another NAN device of the multicast group is to become the coordinator of the multicast group, the election attribute comprising a scheduling rank of the another NAN device; and based on a comparison between the scheduling rank of the another NAN device and a scheduling rank of the NAN device, selecting to become the coordinator of the multicast group and to transmit a second message comprising a second election attribute to indicate the NAN device is to become the coordinator of the multicast group.

Example 62 includes the subject matter of any one of Examples 52-61, and optionally, wherein the operations comprise connecting with all NAN devices of the multicast group during the at least one of the timeblocks to communicate traffic of the service.

Example 63 includes the subject matter of any one of Examples 52-62, and optionally, wherein the operations comprise transmitting a leave message to indicate that the NAN device is to leave the multicast group.

Example 64 includes the subject matter of any one of Examples 52-63, and optionally, wherein the scheduling attribute comprises a group update element to indicate at least one scheduled timeblock to communicate updated group information.

Example 65 includes the subject matter of any one of Examples 52-64, and optionally, wherein the operations comprise processing reception of the scheduling attribute upon setting up a connection with the coordinator or with another NAN device belonging to the multicast group.

Example 66 includes the subject matter of any one of Examples 52-65, and optionally, wherein the message comprising the scheduling attribute comprises a Service Discovery Frame (SDF) or a dedicated Publish Action Frame.

Example 67 includes the subject matter of any one of Examples 52-66, and optionally, wherein the multicast group comprises a many-to-many group.

Example 68 includes an apparatus of a Neighbor Awareness Networking (NAN) device, the apparatus comprising means for processing reception of a message comprising a scheduling attribute from a coordinator of a multicast group, the scheduling attribute comprising a service identifier (ID) corresponding to a service, scheduling information to indicate one or more timeblocks, a list of NAN devices belonging to the multicast group, and a scheduling rank of the coordinator; and means for, based on the scheduling attribute, connecting with one or more NAN devices of the multicast group during at least one of the timeblocks to communicate traffic of the service.

Example 69 includes the subject matter of Example 68, and optionally, comprising means for determining the scheduling rank of the NAN device based on one or more messages from devices of the multicast group, and transmitting one or more messages comprising the scheduling rank of the NAN device.

Example 70 includes the subject matter of Example 68 or 69, and optionally, comprising means for transmitting a refresh message at least every refresh interval to indicate the NAN device is active.

Example 71 includes the subject matter of any one of Examples 68-70, and optionally, comprising means for transmitting to the coordinator a message comprising a cant-connect attribute indicating another NAN device of the multicast group, if a refresh message is not received from the another NAN device of the multicast group for a predefined duration.

Example 72 includes the subject matter of any one of Examples 68-71, and optionally, comprising means for transmitting a message comprising an election attribute to indicate the NAN device is to become the coordinator, the election attribute comprising a scheduling rank of the NAN device.

Example 73 includes the subject matter of Example 72, and optionally, wherein the election attribute comprises a cant-connect attribute indicating one or more NAN devices of the multicast group, from which a refresh message is not received for a predefined duration.

Example 74 includes the subject matter of Example 72 or 73, and optionally, comprising means for transmitting a message comprising a multicast group attribute indicating a tentative multicast group comprising one or more NAN devices, from which one or more refresh messages were received within a predefined duration.

Example 75 includes the subject matter of Example 74, and optionally, wherein each of the one or more NAN devices of the tentative multicast group is able to communicate with all NAN devices of the tentative multicast group.

Example 76 includes the subject matter of Example 74 or 75, and optionally, comprising means for becoming a coordinator of the tentative multicast group, and transmitting a message comprising another scheduling attribute comprising a list of the one or more NAN devices of the tentative multicast group.

Example 77 includes the subject matter of any one of Examples 68-76, and optionally, comprising means for receiving a first message comprising a first election attribute indicating another NAN device of the multicast group is to become the coordinator of the multicast group, the election attribute comprising a scheduling rank of the another NAN device; and means for, based on a comparison between the scheduling rank of the another NAN device and a scheduling rank of the NAN device, selecting to become the coordinator of the multicast group and to transmit a second message comprising a second election attribute to indicate the NAN device is to become the coordinator of the multicast group.

Example 78 includes the subject matter of any one of Examples 68-77, and optionally, comprising means for connecting with all NAN devices of the multicast group during the at least one of the timeblocks to communicate traffic of the service.

Example 79 includes the subject matter of any one of Examples 68-78, and optionally, comprising means for transmitting a leave message to indicate that the NAN device is to leave the multicast group.

Example 80 includes the subject matter of any one of Examples 68-79, and optionally, wherein the scheduling attribute comprises a group update element to indicate at least one scheduled timeblock to communicate updated group information.

Example 81 includes the subject matter of any one of Examples 68-80, and optionally, comprising means for processing reception of the scheduling attribute upon setting up a connection with the coordinator or with another NAN device belonging to the multicast group.

Example 82 includes the subject matter of any one of Examples 68-81, and optionally, wherein the message comprising the scheduling attribute comprises a Service Discovery Frame (SDF) or a dedicated Publish Action Frame.

Example 83 includes the subject matter of any one of Examples 68-82, and optionally, wherein the multicast group comprises a many-to-many group.

Example 84 includes an apparatus comprising a memory and a processor, the processor configured to cause a Neighbor Awareness Networking (NAN) device to generate a scheduling attribute comprising a service identifier (ID) corresponding to a service, scheduling information to indicate one or more timeblocks, a list of NAN devices belonging to a multicast group coordinated by the NAN device, and a scheduling rank of the NAN device; and transmit a message comprising the scheduling attribute.

Example 85 includes the subject matter of Example 84, and optionally, wherein the processor is configured to cause the NAN device to determine the scheduling rank of the NAN device based on one or more messages from devices of the multicast group, and to transmit one or more messages comprising the scheduling rank of the NAN device.

Example 86 includes the subject matter of Example 84 or 85, and optionally, wherein the processor is configured to cause the NAN device to transmit a refresh message at least every refresh interval to indicate the NAN device is active.

Example 87 includes the subject matter of any one of Examples 84-86, and optionally, wherein the processor is configured to cause the NAN device to receive from a first NAN device of the multicast group a message comprising a cant-connect attribute indicating a second NAN device of the multicast group, from which a refresh message is not received at the first NAN device for a predefined duration.

Example 88 includes the subject matter of any one of Examples 84-87, and optionally, wherein the processor is configured to cause the NAN device to receive a message comprising an election attribute from another NAN device to indicate the another NAN device is to become a coordinator, the election attribute comprising a scheduling rank of the another NAN device.

Example 89 includes the subject matter of Example 88, and optionally, wherein the election attribute comprises a cant-connect attribute indicating one or more NAN devices of the multicast group, from which a refresh message is not received at the another NAN device for a predefined duration.

Example 90 includes the subject matter of any one of Examples 84-89, and optionally, wherein the processor is configured to cause the NAN device to receive a first message comprising a first election attribute indicating another NAN device of the multicast group is to become a coordinator of the multicast group, the election attribute comprising a scheduling rank of the another NAN device, and, based on a comparison between the scheduling rank of the another NAN device and a scheduling rank of the NAN device, to select whether or not to transmit a second message comprising a second election attribute to indicate the NAN device is to remain the coordinator of the multicast group.

Example 91 includes the subject matter of any one of Examples 84-90, and optionally, wherein the processor is configured to cause the NAN device to connect with all NAN devices of the multicast group during the at least one of the timeblocks to communicate traffic of the service.

Example 92 includes the subject matter of any one of Examples 84-91, and optionally, wherein the processor is configured to cause the NAN device to transmit a leave message to indicate that the NAN device is to leave the multicast group.

Example 93 includes the subject matter of any one of Examples 84-92, and optionally, wherein the scheduling attribute comprises a group update element to indicate at least one scheduled timeblock to communicate updated group information.

Example 94 includes the subject matter of any one of Examples 84-93, and optionally, wherein the processor is configured to cause the NAN device to transmit the message comprising the scheduling attribute upon setting up a connection with another NAN device belonging to the multicast group.

Example 95 includes the subject matter of any one of Examples 84-94, and optionally, wherein the message comprising the scheduling attribute comprises a Service Discovery Frame (SDF) or a dedicated Publish Action Frame.

Example 96 includes the subject matter of any one of Examples 84-95, and optionally, wherein the multicast group comprises a many-to-many group.

Example 97 includes the subject matter of any one of Examples 84-96, and optionally, comprising a radio.

Example 98 includes the subject matter of any one of Examples 84-97, and optionally, comprising one or more antennas, a memory and a processor.

Example 99 includes a system of wireless communication comprising a Neighbor Awareness Networking (NAN) device, the NAN device comprising a radio; a memory; and a processor configured to cause the NAN device to generate a scheduling attribute comprising a service identifier (ID) corresponding to a service, scheduling information to indicate one or more timeblocks, a list of NAN devices belonging to a multicast group coordinated by the NAN device, and a scheduling rank of the NAN device; and transmit a message comprising the scheduling attribute.

Example 100 includes the subject matter of Example 99, and optionally, wherein the processor is configured to cause the NAN device to determine the scheduling rank of the NAN device based on one or more messages from devices of the multicast group, and to transmit one or more messages comprising the scheduling rank of the NAN device.

Example 101 includes the subject matter of Example 99 or 100, and optionally, wherein the processor is configured to cause the NAN device to transmit a refresh message at least every refresh interval to indicate the NAN device is active.

Example 102 includes the subject matter of any one of Examples 99-101, and optionally, wherein the processor is configured to cause the NAN device to receive from a first NAN device of the multicast group a message comprising a cant-connect attribute indicating a second NAN device of the multicast group, from which a refresh message is not received at the first NAN device for a predefined duration.

Example 103 includes the subject matter of any one of Examples 99-102, and optionally, wherein the processor is configured to cause the NAN device to receive a message comprising an election attribute from another NAN device to indicate the another NAN device is to become a coordinator, the election attribute comprising a scheduling rank of the another NAN device.

Example 104 includes the subject matter of Example 103, and optionally, wherein the election attribute comprises a cant-connect attribute indicating one or more NAN devices of the multicast group, from which a refresh message is not received at the another NAN device for a predefined duration.

Example 105 includes the subject matter of any one of Examples 99-104, and optionally, wherein the processor is configured to cause the NAN device to receive a first message comprising a first election attribute indicating another NAN device of the multicast group is to become a coordinator of the multicast group, the election attribute comprising a scheduling rank of the another NAN device, and, based on a comparison between the scheduling rank of the another NAN device and a scheduling rank of the NAN device, to select whether or not to transmit a second message comprising a second election attribute to indicate the NAN device is to remain the coordinator of the multicast group.

Example 106 includes the subject matter of any one of Examples 99-105, and optionally, wherein the processor is configured to cause the NAN device to connect with all NAN devices of the multicast group during the at least one of the timeblocks to communicate traffic of the service.

Example 107 includes the subject matter of any one of Examples 99-106, and optionally, wherein the processor is configured to cause the NAN device to transmit a leave message to indicate that the NAN device is to leave the multicast group.

Example 108 includes the subject matter of any one of Examples 99-107, and optionally, wherein the scheduling attribute comprises a group update element to indicate at least one scheduled timeblock to communicate updated group information.

Example 109 includes the subject matter of any one of Examples 99-108, and optionally, wherein the processor is configured to cause the NAN device to transmit the message comprising the scheduling attribute upon setting up a connection with another NAN device belonging to the multicast group.

Example 110 includes the subject matter of any one of Examples 99-109, and optionally, wherein the message comprising the scheduling attribute comprises a Service Discovery Frame (SDF) or a dedicated Publish Action Frame.

Example 111 includes the subject matter of any one of Examples 99-110, and optionally, wherein the multicast group comprises a many-to-many group.

Example 112 includes a method to be performed at a Neighbor Awareness Networking (NAN) device, the method comprising generating a scheduling attribute comprising a service identifier (ID) corresponding to a service, scheduling information to indicate one or more timeblocks, a list of NAN devices belonging to a multicast group coordinated by the NAN device, and a scheduling rank of the NAN device; and transmitting a message comprising the scheduling attribute.

Example 113 includes the subject matter of Example 112, and optionally, comprising determining the scheduling rank of the NAN device based on one or more messages from devices of the multicast group, and transmitting one or more messages comprising the scheduling rank of the NAN device.

Example 114 includes the subject matter of Example 112 or 113, and optionally, comprising transmitting a refresh message at least every refresh interval to indicate the NAN device is active.

Example 115 includes the subject matter of any one of Examples 112-114, and optionally, comprising receiving from a first NAN device of the multicast group a message comprising a cant-connect attribute indicating a second NAN device of the multicast group, from which a refresh message is not received at the first NAN device for a predefined duration.

Example 116 includes the subject matter of any one of Examples 112-115, and optionally, comprising receiving a message comprising an election attribute from another NAN device to indicate the another NAN device is to become a coordinator, the election attribute comprising a scheduling rank of the another NAN device.

Example 117 includes the subject matter of Example 116, and optionally, wherein the election attribute comprises a cant-connect attribute indicating one or more NAN devices of the multicast group, from which a refresh message is not received at the another NAN device for a predefined duration.

Example 118 includes the subject matter of any one of Examples 112-117, and optionally, comprising receiving a first message comprising a first election attribute indicating another NAN device of the multicast group is to become a coordinator of the multicast group, the election attribute comprising a scheduling rank of the another NAN device; and based on a comparison between the scheduling rank of the another NAN device and a scheduling rank of the NAN device, selecting whether or not to transmit a second message comprising a second election attribute to indicate the NAN device is to remain the coordinator of the multicast group.

Example 119 includes the subject matter of any one of Examples 112-118, and optionally, comprising connecting with all NAN devices of the multicast group during the at least one of the timeblocks to communicate traffic of the service.

Example 120 includes the subject matter of any one of Examples 112-119, and optionally, comprising transmitting a leave message to indicate that the NAN device is to leave the multicast group.

Example 121 includes the subject matter of any one of Examples 112-120, and optionally, wherein the scheduling attribute comprises a group update element to indicate at least one scheduled timeblock to communicate updated group information.

Example 122 includes the subject matter of any one of Examples 112-121, and optionally, comprising transmitting the message comprising the scheduling attribute upon setting up a connection with another NAN device belonging to the multicast group.

Example 123 includes the subject matter of any one of Examples 112-122, and optionally, wherein the message comprising the scheduling attribute comprises a Service Discovery Frame (SDF) or a dedicated Publish Action Frame.

Example 124 includes the subject matter of any one of Examples 112-123, and optionally, wherein the multicast group comprises a many-to-many group.

Example 125 includes a product comprising one or more tangible computer-readable non-transitory storage media comprising computer-executable instructions operable to, when executed by at least one computer processor, enable the at least one computer processor to implement one or more operations at a Neighbor Awareness Networking (NAN) device, the operations comprising generating a scheduling attribute comprising a service identifier (ID) corresponding to a service, scheduling information to indicate one or more timeblocks, a list of NAN devices belonging to a multicast group coordinated by the NAN device, and a scheduling rank of the NAN device; and transmitting a message comprising the scheduling attribute.

Example 126 includes the subject matter of Example 125, and optionally, wherein the operations comprise determining the scheduling rank of the NAN device based on one or more messages from devices of the multicast group, and transmitting one or more messages comprising the scheduling rank of the NAN device.

Example 127 includes the subject matter of Example 125 or 126, and optionally, wherein the operations comprise transmitting a refresh message at least every refresh interval to indicate the NAN device is active.

Example 128 includes the subject matter of any one of Examples 125-127, and optionally, wherein the operations comprise receiving from a first NAN device of the multicast group a message comprising a cant-connect attribute indicating a second NAN device of the multicast group, from which a refresh message is not received at the first NAN device for a predefined duration.

Example 129 includes the subject matter of any one of Examples 125 128, and optionally, wherein the operations comprise receiving a message comprising an election attribute from another NAN device to indicate the another NAN device is to become a coordinator, the election attribute comprising a scheduling rank of the another NAN device.

Example 130 includes the subject matter of Example 129, and optionally, wherein the election attribute comprises a cant-connect attribute indicating one or more NAN devices of the multicast group, from which a refresh message is not received at the another NAN device for a predefined duration.

Example 131 includes the subject matter of any one of Examples 125-130, and optionally, wherein the operations comprise receiving a first message comprising a first election attribute indicating another NAN device of the multicast group is to become a coordinator of the multicast group, the election attribute comprising a scheduling rank of the another NAN device; and based on a comparison between the scheduling rank of the another NAN device and a scheduling rank of the NAN device, selecting whether or not to transmit a second message comprising a second election attribute to indicate the NAN device is to remain the coordinator of the multicast group.

Example 132 includes the subject matter of any one of Examples 125-131, and optionally, wherein the operations comprise connecting with all NAN devices of the multicast group during the at least one of the timeblocks to communicate traffic of the service.

Example 133 includes the subject matter of any one of Examples 125-132, and optionally, wherein the operations comprise transmitting a leave message to indicate that the NAN device is to leave the multicast group.

Example 134 includes the subject matter of any one of Examples 125-133, and optionally, wherein the scheduling attribute comprises a group update element to indicate at least one scheduled timeblock to communicate updated group information.

Example 135 includes the subject matter of any one of Examples 125-134, and optionally, wherein the operations comprise transmitting the message comprising the scheduling attribute upon setting up a connection with another NAN device belonging to the multicast group.

Example 136 includes the subject matter of any one of Examples 125-135, and optionally, wherein the message comprising the scheduling attribute comprises a Service Discovery Frame (SDF) or a dedicated Publish Action Frame.

Example 137 includes the subject matter of any one of Examples 125-136, and optionally, wherein the multicast group comprises a many-to-many group.

Example 138 includes an apparatus of a Neighbor Awareness Networking (NAN) device, the apparatus comprising means for generating a scheduling attribute comprising a service identifier (ID) corresponding to a service, scheduling information to indicate one or more timeblocks, a list of NAN devices belonging to a multicast group coordinated by the NAN device, and a scheduling rank of the NAN device; and means for transmitting a message comprising the scheduling attribute.

Example 139 includes the subject matter of Example 138, and optionally, comprising means for determining the scheduling rank of the NAN device based on one or more messages from devices of the multicast group, and transmitting one or more messages comprising the scheduling rank of the NAN device.

Example 140 includes the subject matter of Example 138 or 139, and optionally, comprising means for transmitting a refresh message at least every refresh interval to indicate the NAN device is active.

Example 141 includes the subject matter of any one of Examples 138-140, and optionally, comprising means for receiving from a first NAN device of the multicast group a message comprising a cant-connect attribute indicating a second NAN device of the multicast group, from which a refresh message is not received at the first NAN device for a predefined duration.

Example 142 includes the subject matter of any one of Examples 138-141, and optionally, comprising means for receiving a message comprising an election attribute from another NAN device to indicate the another NAN device is to become a coordinator, the election attribute comprising a scheduling rank of the another NAN device.

Example 143 includes the subject matter of Example 142, and optionally, wherein the election attribute comprises a cant-connect attribute indicating one or more NAN devices of the multicast group, from which a refresh message is not received at the another NAN device for a predefined duration.

Example 144 includes the subject matter of any one of Examples 138 143, and optionally, comprising means for receiving a first message comprising a first election attribute indicating another NAN device of the multicast group is to become a coordinator of the multicast group, the election attribute comprising a scheduling rank of the another NAN device; and means for, based on a comparison between the scheduling rank of the another NAN device and a scheduling rank of the NAN device, selecting whether or not to transmit a second message comprising a second election attribute to indicate the NAN device is to remain the coordinator of the multicast group.

Example 145 includes the subject matter of any one of Examples 138-144, and optionally, comprising means for connecting with all NAN devices of the multicast group during the at least one of the timeblocks to communicate traffic of the service.

Example 146 includes the subject matter of any one of Examples 138-145, and optionally, comprising means for transmitting a leave message to indicate that the NAN device is to leave the multicast group.

Example 147 includes the subject matter of any one of Examples 138-146, and optionally, wherein the scheduling attribute comprises a group update element to indicate at least one scheduled timeblock to communicate updated group information.

Example 148 includes the subject matter of any one of Examples 138-147, and optionally, comprising means for transmitting the message comprising the scheduling attribute upon setting up a connection with another NAN device belonging to the multicast group.

Example 149 includes the subject matter of any one of Examples 138-148, and optionally, wherein the message comprising the scheduling attribute comprises a Service Discovery Frame (SDF) or a dedicated Publish Action Frame.

Example 150 includes the subject matter of any one of Examples 138-149, and optionally, wherein the multicast group comprises a many-to-many group.

Functions, operations, components and/or features described herein with reference to one or more embodiments, may be combined with, or may be utilized in combination with, one or more other functions, operations, components and/or features described herein with reference to one or more other embodiments, or vice versa.

While certain features have been illustrated and described herein, many modifications, substitutions, changes, and equivalents may occur to those skilled in the art. It is, therefore, to be understood that the appended claims are intended to cover all such modifications and changes as fall within the true spirit of the disclosure.

What is claimed is:

1. An apparatus comprising a memory and a processor, the processor configured to cause a Neighbor Awareness Networking (NAN) device to:

process reception of a scheduling message comprising a scheduling attribute from a coordinator of a multicast group, the scheduling attribute comprising a service identifier (ID) corresponding to a service, scheduling information to indicate one or more timeblocks, a list of NAN devices belonging to the multicast group, and a scheduling rank of the coordinator;

based on the scheduling attribute, connect with a first NAN device of the multicast group during at least one of the timeblocks to communicate traffic of the service; and transmit to the coordinator a cant connect message comprising a cant-connect attribute indicating a second NAN device of the multicast group based on a failure to connect to the second NAN device;

wherein the first NAN device determines the failure to connect based on failing to receive a refresh message from the second NAN device of the multicast group for a predefined duration, and wherein the predefined duration is defined as a multiple of a refresh interval specified in the scheduling message.

2. The apparatus of claim 1, wherein the processor is configured to cause the first NAN device to determine the scheduling rank of the first NAN device based on one or more first messages from one or more other ones of the NAN devices of the multicast group, and to transmit one or more second messages comprising the scheduling rank of the first NAN device.

3. The apparatus of claim 1, wherein the processor is configured to cause the first NAN device to transmit a refresh message at least every refresh interval to indicate the first NAN device is active.

4. The apparatus of claim 1, wherein the processor is configured to cause the first NAN device to transmit an election attribute to indicate the first NAN device is to become the coordinator, the election attribute comprising a scheduling rank of the first NAN device.

5. The apparatus of claim 4, wherein the election attribute comprises a cant-connect attribute indicating one or more other ones of the NAN devices of the multicast group, from which a refresh message is not received for a predefined duration.

6. The apparatus of claim 4, wherein the processor is configured to cause the first NAN device to transmit a multicast group attribute indicating a tentative multicast group comprising one or more other ones of the NAN devices, from which one or more refresh messages were received within a predefined duration.

7. The apparatus of claim 6, wherein the processor is configured to cause the first NAN device to become a coordinator of the tentative multicast group, and to transmit a second scheduling message comprising another scheduling attribute comprising a list of the one or more other ones of the NAN devices of the tentative multicast group.

8. The apparatus of claim 1, wherein the processor is configured to cause the first NAN device to receive a first message comprising a first election attribute indicating a third NAN device of the multicast group is to become the coordinator of the multicast group, the election attribute comprising a first scheduling rank of the third NAN device, and, based on a comparison between the first scheduling rank of the third NAN device and a second scheduling rank of the first NAN device, to select to become the coordinator of the multicast group and to transmit a second message comprising a second election attribute to indicate the first NAN device is to become the coordinator of the multicast group.

9. The apparatus of claim 1, wherein the processor is configured to cause the first NAN device to transmit a leave message to indicate that the first NAN device is to leave the multicast group.

10. The apparatus of claim 1, wherein the scheduling message comprising the scheduling attribute comprises a Service Discovery Frame (SDF) or a dedicated Publish Action Frame.

11. The apparatus of claim 1, wherein the multicast group comprises a many-to-many group.

12. The apparatus of claim 1 comprising one or more antennas.

13. A product comprising one or more tangible computer-readable non-transitory storage media comprising computer-executable instructions operable to, when executed by at least one computer processor, enable the at least one computer processor to implement one or more operations at a Neighbor Awareness Networking (NAN) device, the one or more operations comprising:
   processing reception of a scheduling message comprising a scheduling attribute from a coordinator of a multicast group, the scheduling attribute comprising a service identifier (ID) corresponding to a service, scheduling information to indicate one or more timeblocks, a list of NAN devices belonging to the multicast group, and a scheduling rank of the coordinator;
   based on the scheduling attribute, connecting with a first NAN device of the multicast group during at least one of the timeblocks to communicate traffic of the service;
   transmitting to the coordinator a cant connect message comprising a cant-connect attribute indicating a second NAN device of the multicast group based on a failure to connect to the second NAN device; and
   transmitting to the coordinator the cant connect message if a refresh message is not received from the second NAN device of the multicast group for a predefined duration, wherein the predefined duration is defined as a multiple of a refresh interval specified in the scheduling message.

14. The product of claim 13, wherein the one or more operations comprise transmitting an election attribute to indicate which one of the NAN devices is to become the coordinator, the election attribute comprising a scheduling rank of the NAN devices.

15. An apparatus comprising a memory and a processor, the processor configured to cause a first Neighbor Awareness Networking (NAN) device to:
   generate a scheduling attribute comprising a service identifier (ID) corresponding to a service, scheduling information to indicate one or more timeblocks, a list of NAN devices belonging to a multicast group coordinated by the first NAN device, and a scheduling rank of the first NAN device;
   transmit a first message comprising the scheduling attribute; and
   receive, from the first NAN device, a second message comprising a cant-connect attribute indicating a failure to connect to a second NAN device of the multicast group;
   wherein the failure to connect to the second NAN device is determined based on the first NAN device failing to receive a refresh message for a predefined duration, and wherein the predefined duration is defined as a multiple of a refresh interval specified in the scheduling message.

16. The apparatus of claim 15, wherein the processor is configured to cause the first NAN device to determine the scheduling rank of the first NAN device based on one or more third messages from one or more NAN devices of the multicast group, and to transmit one or more fourth messages comprising the scheduling rank of the first NAN device.

17. The apparatus of claim 15, wherein the processor is configured to cause the first NAN device to transmit a refresh message at least every refresh interval to indicate the first NAN device is active.

18. The apparatus of claim 15, wherein the processor is configured to cause the first NAN device to receive a third message comprising a first election attribute indicating a third NAN device of the multicast group is to become a coordinator of the multicast group, the election attribute comprising a first scheduling rank of the third NAN device, and, based on a comparison between the first scheduling rank of the third NAN device and a second scheduling rank of the first NAN device, to select whether or not to transmit a fourth message comprising a second election attribute to indicate the first NAN device is to remain the coordinator of the multicast group.

19. The apparatus of claim 15 comprising one or more antennas.

20. A product comprising one or more tangible computer-readable non-transitory storage media comprising computer-executable instructions operable to, when executed by at least one computer processor, enable the at least one computer processor to implement one or more operations at a first Neighbor Awareness Networking (NAN) device, the one or more operations comprising:
   generating a scheduling attribute comprising a service identifier (ID) corresponding to a service, scheduling information to indicate one or more timeblocks, a list of NAN devices belonging to a multicast group coordinated by the first NAN device, and a scheduling rank of the first NAN device;
   transmitting a first message comprising the scheduling attribute; and
   receiving, from a second one of the NAN devices in the multicast group, a second message comprising a cant-connect attribute indicating a failure to connect to the second NAN device of the multicast group;
   wherein the failure to connect to the second NAN device is determined based on the first NAN device failing to receive a refresh message for a predefined duration, and wherein the predefined duration is defined as a multiple of a refresh interval specified in the scheduling message.

21. The product of claim 20, wherein the one or more operations comprise determining the scheduling rank of the first NAN device based on one or more third messages from the one or more NAN devices of the multicast group, and transmitting one or more fourth messages comprising the scheduling rank of the first NAN device.

22. The product of claim 20, wherein the one or more operations comprise:
   receiving a third message comprising a first election attribute indicating a third NAN device of the multicast group is to become a coordinator of the multicast group, the election attribute comprising a first scheduling rank of the third NAN device; and based on a comparison between the first scheduling rank of the third NAN device and a second scheduling rank of the first NAN device, selecting whether or not to transmit a fourth message comprising a second election attribute to indicate the first NAN device is to remain the coordinator of the multicast group.

\* \* \* \* \*